(12) United States Patent
Yang et al.

(10) Patent No.: US 12,732,098 B2
(45) Date of Patent: Sep. 8, 2026

(54) RESONANT POWER CONVERSION CIRCUIT AND CONTROL METHOD THEREOF FOR BALANCING DUTY CYCLES OF HIGH-SIDE TRANSISTOR AND LOW-SIDE TRANSISTOR

(71) Applicant: Richtek Technology Corporation, Zhubei City (TW)

(72) Inventors: Ta-Yung Yang, Taoyuan City (TW); Yu-Chang Chen, Jiji Township (TW); Kuo-Chi Liu, Hsinchu City (TW); Tzu-Chen Lin, Zhubei City (TW)

(73) Assignee: RICHTEK TECHNOLOGY CORPORATION, Zhubei City (TW)

( * ) Notice: Subject to any disclaimer, the term of this patent is extended or adjusted under 35 U.S.C. 154(b) by 133 days.

(21) Appl. No.: 18/953,258

(22) Filed: Nov. 20, 2024

(65) Prior Publication Data

US 2025/0211101 A1 Jun. 26, 2025

Related U.S. Application Data

(60) Provisional application No. 63/614,680, filed on Dec. 26, 2023.

(30) Foreign Application Priority Data

Jun. 12, 2024 (TW) ................................ 113121634

(51) Int. Cl.
*H02M 3/00* (2006.01)
*H02M 1/00* (2007.01)
(Continued)

(52) U.S. Cl.
CPC .......... *H02M 3/01* (2021.05); *H02M 1/0009* (2021.05); *H02M 1/40* (2013.01);
(Continued)

(58) Field of Classification Search
CPC .... H02M 1/0009; H02M 1/0035; H02M 1/36; H02M 1/38–1/40; H02M 3/01;
(Continued)

(56) References Cited

U.S. PATENT DOCUMENTS 8,699,240 B2 4/2014 Adragna
2008/0136343 A1 6/2008 Yu
(Continued)

FOREIGN PATENT DOCUMENTS

EP 3012956 B1 * 8/2023 ............. H02M 1/08
TW 201340569 A 10/2013

*Primary Examiner* — Fred E Finch, III
(74) *Attorney, Agent, or Firm* — McClure, Qualey & Rodack, LLP

(57) ABSTRACT

A resonant power conversion circuit includes a resonant capacitor, a transformer, a high-side transistor, a low-side transistor, a first current detection circuit, an integrator, and a full-wave rectifying circuit. The resonant capacitor is coupled between a resonant node and a ground. The transformer includes a primary coil coupled between a switch node and the resonant node. The high-side transistor provides an input voltage to the switch node and the low-side transistor couples the switch node to the ground. The first current detection circuit generates a current detection signal based on a voltage of the resonant node. The integrator generates an integrating signal based on the current detection signal. The full-wave rectification circuit full-wave rectifies the integral signal to generate a rectified signal.

28 Claims, 16 Drawing Sheets

(51) Int. Cl.
*H02M 1/40* (2007.01)
*H02M 3/335* (2006.01)
*H02M 1/36* (2007.01)
*H02M 1/38* (2007.01)

(52) U.S. Cl.
CPC ...... *H02M 3/33571* (2021.05); *H02M 1/0035* (2021.05); *H02M 1/36* (2013.01); *H02M 1/38* (2013.01); *H02M 3/33507* (2013.01)

(58) Field of Classification Search
CPC ............. H02M 3/015; H02M 3/33507; H02M 3/33571; H02M 3/33573
See application file for complete search history.

(56) References Cited

U.S. PATENT DOCUMENTS

2012/0069605 A1* 3/2012 Choi ................. H02M 3/33571 363/21.02
2015/0092453 A1* 4/2015 Ohtake ............... H02M 3/3376 363/21.02
2018/0062383 A1* 3/2018 Kawashima ......... H02H 7/1213
2020/0088769 A1* 3/2020 Jin ......................... G01R 19/10
2020/0169160 A1* 5/2020 Kikuchi ............ H02M 3/33571
2023/0088584 A1* 3/2023 Panov ................. H02M 1/0009 323/271
2023/0396176 A1* 12/2023 Ou .......................... H02M 3/01

* cited by examiner

RESONANT POWER CONVERSION CIRCUIT AND CONTROL METHOD THEREOF FOR BALANCING DUTY CYCLES OF HIGH-SIDE TRANSISTOR AND LOW-SIDE TRANSISTOR

CROSS REFERENCE TO RELATED APPLICATIONS

This application claims the benefit of U.S. Provisional Application No. 63/614,680, filed on Dec. 26, 2023, the entirety of which is incorporated by reference herein.

This Application claims priority of Taiwan Patent Application No. 113121634, filed on Jun. 12, 2024, the entirety of which is incorporated by reference herein.

BACKGROUND OF THE INVENTION

Field of the Invention

The disclosure is generally related to a resonant power conversion circuit and a control method thereof, and more particularly it is related to a resonant power conversion circuit and a control method thereof controlling the high-side transistor and the low-side transistor through a rectification signal and a feedback voltage generated by full-wave rectification and a signal related to the voltage across the resonant capacitor.

Description of the Related Art

With the ongoing development of portable electronic devices, the trend in power conversion circuits (like most power products) has been toward high efficiency, high power density, high reliability, and low cost. Resonant power conversion circuits (including LLC resonant power conversion circuit, etc.) have advantages that include zero-voltage switching (ZVS) on the primary side and zero-current switching (ZCS) of the rectifier diode on the secondary side within the full load range. Frequency control is used to make the duty cycle of the high-side and low-side transistors both 50% with no output inductor required. Lower voltage transistors can be used on the secondary side to reduce costs and also improve efficiency, and they have been increasingly used in DC voltage converters in recent years.

In fact, the duty cycles of the high-side transistor and the low-side transistor are not both 50%, however, so the current transmitted to the secondary side is uneven, resulting in a lower conversion efficiency. Therefore, it is necessary to balance the duty cycles of the high-side transistor and the low-side transistor.

BRIEF SUMMARY OF THE INVENTION

In an embodiment, a resonant power conversion circuit is provided. The resonant power conversion circuit comprises a resonant capacitor, a transformer, a high-side transistor, a low-side transistor, a first current detection circuit, an integrator, a full-wave rectification device, a control circuit, a regulation circuit, and a feedback circuit. The resonant capacitor is coupled between a resonant node and a ground. The transformer comprises a primary coil and a secondary coil, wherein the primary coil is coupled between a switch node and the resonant node. The high-side transistor provides an input voltage to the switch node based on a high-side driving signal. The low-side transistor couples the switch node to the ground based on a low-side driving signal. The first current detection circuit generates a current detection signal based on a voltage of the resonant node. The integrator generates an integral signal based on the current detection signal. The full-wave rectification device full-wave rectifies the integral signal generated by the integrator to generate a rectified signal. The control circuit generates the high-side driving signal and the low-side driving signal based on the rectified signal and a feedback voltage. The regulation circuit is coupled to the secondary coil and converts a current flowing through the secondary coil to an output voltage. The feedback circuit generates the feedback voltage based on the output voltage.

According to an embodiment of the present invention, the first current detection circuit comprises a first capacitor and a first resistor. The first capacitor is coupled between the resonant node and a first detection node. The first resistor is coupled between the first detection node and the ground. The first current detection circuit generates the current detection signal at the first detection node.

According to an embodiment of the present invention, the integrator comprises an integrating amplifier, a second capacitor, a second resistor, a third resistor, and a third capacitor. The integrating amplifier comprises an integral positive input terminal, an integral negative input terminal, and an integral output terminal, wherein the integral positive input terminal receives a reference voltage, and the integral output terminal generates the integral signal. The second capacitor is coupled between the first detection node and a second detection node. The second resistor is coupled between the second detection node and the integral negative input terminal. The third resistor is coupled between the integral negative input terminal and the integral output terminal. The third capacitor is coupled between the integral negative input terminal and the integral output terminal.

According to an embodiment of the present invention, the full-wave rectification device uses a basic voltage as DC level and full-wave rectifies the integral signal to generate the rectified signal. The basic voltage is equal to a sum of the reference voltage and an offset voltage. The full-wave rectification device further compares the rectified signal with a first threshold voltage to generate a crossover signal. The first threshold voltage is slightly higher than the basic voltage.

According to an embodiment of the present invention, the control circuit comprises a digital circuit, a first amplifier, a second amplifier, a second resistor, an N-type transistor, a current mirror, and a summing circuit. The digital circuit gradually increases a soft-start voltage to the feedback voltage in a predetermined period. The first amplifier comprises a first positive input terminal, a first negative input terminal, and a first output terminal, wherein the first positive input terminal receives the soft-start voltage, and the first negative input terminal is coupled to the first output terminal. The second amplifier comprises a second positive input terminal, a second negative input terminal, and a second output terminal, wherein the second positive input terminal receives a feedback threshold voltage, and the second output terminal generates a compensation voltage. The second resistor is coupled between the second negative input terminal and the first output terminal and generating a difference current. The N-type transistor comprises a gate terminal, a drain terminal, and a source terminal, wherein the gate terminal is coupled to the second output terminal, and the source terminal is coupled to the second negative terminal. The current mirror maps the difference current to at least one mapping current. The summing circuit subtracts a sawtooth wave from the compensation voltage to generate a compensation signal. When the soft-start voltage is less than the feedback threshold voltage, the compensation voltage is equal to the feedback threshold voltage. When the soft-start voltage is not less than the feedback threshold voltage, the compensation voltage is equal to the soft-start voltage.

According to an embodiment of the present invention, when the rectified signal is less than the first threshold voltage, the full-wave rectification device sets the crossover signal to a disabled state. When the rectified signal is not less than the first threshold voltage, the full-wave rectification device sets the crossover signal to an enabled state. In response to the crossover signal changing from the disabled state to the enabled state, the control circuit sets a phase signal to the enabled state. In response to the rectified signal exceeding the feedback voltage, the control circuit sets the phase signal to the disabled state based on a high-side dead time signal or a low-side dead time signal. The high-side dead time signal controls a high-side dead time of the high-side driving signal. The low-side dead time signal controls a low-side dead time of the low-side driving signal.

According to an embodiment of the present invention, when the high-side driving signal turns on the high-side transistor and the phase signal is in the enabled state, the control circuit disables the high-side driving signal in response to the rectified signal exceeding the feedback voltage. When the high-side signal turns off the high-side transistor, the control circuit enables the low-side driving signal to turn on the low-side transistor after the low-side dead time. When the low-side driving signal turns on the low-side transistor and the phase signal is in the enabled state, the control circuit disables the low-side driving signal in response to the compensation signal exceeding the feedback voltage. When the low-side driving signal turns off the low-side transistor, the control circuit enables the high-side driving signal to turn on the high-side transistor after the high-side dead time.

According to an embodiment of the present invention, the control circuit further limits an enable period of the high-side driving signal and an enable period of the low-side driving signal to no longer than a maximum enable period.

According to an embodiment of the present invention, the offset voltage is determined based on a difference between an enable period of the high-side driving signal and an enable period of the low-side driving signal. The offset voltage is configured to adjust the enable period of the high-side driving signal and the enable period of the low-side driving signal so that the enable period of the high-side driving signal is close to the enable period of the low-side driving signal.

According to another embodiment of the present invention, the full-wave rectification device comprises a fourth resistor, a first current source, and an automatic adjustment circuit. The fourth resistor is coupled between the reference voltage and the basic voltage, wherein a voltage across the fourth resistor generates the offset voltage. The first current source provides a first current flowing to the basic voltage. The automatic adjustment circuit sinks an adjustment current from the basic voltage based on the high-side driving signal, the low-side driving signal, the high-side dead time signal, and the low-side dead time signal.

According to an embodiment of the present invention, in response to the first current exceeding the adjustment current, the offset voltage is positive and the basic voltage exceeds the reference voltage. In response to the first current being less than the adjustment current, the offset voltage is negative and the basic voltage is less than the reference voltage. In response to the first current being equal to the adjustment current, the basic voltage is equal to the reference voltage.

According to an embodiment of the present invention, the automatic adjustment circuit comprises a time-to-voltage conversion circuit. The time-to-voltage conversion circuit is configured to respectively convert an enable period of the high-side driving signal and an enable period of the low-side driving signal into a high-side enable-period voltage and a low-side enable-period voltage. The time-to-voltage conversion circuit comprises a second current source, a first switch, a second switch, a fourth capacitor, a fifth capacitor, a fifth capacitor, a sixth capacitor, a third switch, and a fourth switch. The second current source provides a second current. The first switch provides the second current to a charge node based on the high-side driving signal or the low-side driving signal being enabled. The second switch couples the charge node to the ground in the high-side dead time and the low-side dead time. The fourth capacitor is coupled between the charge node and the ground. The fifth capacitor is coupled between a high-side enable-period voltage and the ground. The sixth capacitor is coupled between a low-side enable-period voltage and the ground. The third switch couples the charge node to the high-side enable-period voltage based on the high-side driving signal being enabled. The fourth switch couples the charge node to the low-side enable-period voltage based on the low-side driving signal being enabled. The high-side enable-period voltage represents the enable period of the high-side driving signal, and the low-side enable-period voltage represents the enable period of the low-side driving signal.

According to an embodiment of the present invention, the automatic adjustment circuit further comprises a first comparison circuit, a plurality of registers, a counter, and a digital-to-analog converter. The first comparison circuit compares the high-side enable-period voltage to the low-side enable period to generate an up-count signal and a down-count signal. The registers are configured to latch the up-count signal and the down-count signal in the high-side dead time and the low-side dead time. The counter up-counts a digital code based on the up-count signal being enabled and down-counting the digital code based on the down-count signal being enabled. The digital-to-analog converter generates the adjustment current based on the digital code. When the high-side enable-period voltage exceeds the low-side enable-period voltage, the first comparison circuit enables the up-count signal and disables the down-count signal. When the high-side enable-period voltage does not exceed the low-side enable-period voltage, the first comparison circuit disables the up-count signal and enables the down-count signal.

According to an embodiment of the present invention, in response to the output voltage increasing, the feedback voltage decreases. In response to the feedback voltage being less than a low-power threshold voltage, a low-side dead time signal enables a burst signal, so that the control circuit operates in a burst mode based on the burst signal being enabled. When the control circuit operates in the burst mode, the high-side transistor and the low-side transistor are turned off. A duration of the burst mode increases as output power of the output voltage decreases. The duration is determined by the mapping current.

According to an embodiment of the present invention, the resonant power conversion circuit further comprises a second current detection circuit. The second current detection circuit, generating an over-current signal and a zero-current signal based on the current detection signal. When a current flowing through the resonant capacitor exceeds a predetermined value, the over-current signal is in a reset state and the control circuit disables the high-side driving signal and the low-side driving signal based on the over-current signal being in the reset state. When the current flowing through the resonant capacitor is close to zero, the zero-current signal is in the enabled state, so that the control circuit enables the low-side driving signal based on the zero-current signal being in the enabled state.

According to an embodiment of the present invention, the control circuit further operates in the burst mode based on the burst signal being in the enabled state and the zero-current signal being in the enabled state. The burst mode starts when the high-side driving signal is in the disabled state and ends when the low-side driving signal is in the enabled state.

According to an embodiment of the present invention, the second current detection circuit comprises a fifth resistor, a third current source, a second comparison circuit, and a third comparison circuit. The fifth resistor is coupled between the first detection node and a third detection node. The third current source provides a third current flowing to the third detection node so that the third current flows through the fifth resistor and the first resistor. A current detection voltage is generated at the third detection node. The second comparison circuit compares the current detection voltage with a first upper threshold voltage and a first lower threshold voltage to generate the over-current signal. The third comparison circuit compares the current detection voltage with a zero-current threshold voltage to generate the zero-current signal. When the current detection voltage exceeds the first upper threshold voltage or the current detection voltage is less than the first lower threshold voltage, the second comparison circuit sets the over-current signal to be in the reset state. When the current detection voltage exceeds the zero-current threshold voltage, the third comparison circuit sets the zero-current signal to be in the enabled state. The third current flows through the fifth resistor and the first resistor to generate a DC voltage. The zero-current threshold voltage is slightly higher than the DC voltage.

According to an embodiment of the present invention, the second current detection circuit comprises a second comparison circuit and a third comparison circuit. The second comparison circuit compares a voltage of the second detection node with a second upper threshold voltage and a second lower threshold voltage to generate the over-current signal. The third comparison circuit compares the voltage of the second detection node with a zero-current threshold voltage to generate the zero-current signal. When the voltage of the second detection node exceeds the second upper threshold voltage or the voltage of the second detection node is less than the second lower threshold voltage, the second comparison circuit sets the over-current signal to be in the reset state. The voltage of the second detection node exceeds the zero-current threshold voltage, the third comparison circuit sets the zero-current signal to be in the enabled state. The zero-current threshold voltage is slightly higher than zero.

In another embodiment, a control method for controlling a resonant power conversion circuit is provided. The resonant power conversion circuit comprises a resonant capacitor coupled between a resonant node and a ground, a transformer comprising a primary coil and a secondary coil, a high-side transistor providing an input voltage to a switch node, a low-side transistor coupling the switch node to the ground, a regulation circuit regulating a current flowing through the secondary coil to an output voltage, and a feedback circuit generating a feedback voltage based on the output voltage. The primary coil is coupled between the switch node and the resonant node. The control method comprises the following steps. A current detection signal is generated by using a first current detection circuit to detect a current flowing through the resonant capacitor. The current detection signal is integrated based on a reference voltage to generate an integral signal. The integral signal is full-wave rectified to generate a rectified signal. The high-side transistor and the low-side transistor are driven based on the rectified signal and a feedback voltage. The first current detection circuit comprises a first capacitor and a first resistor. The first capacitor is coupled between the resonant node and a first detection node, and the first resistor is coupled between the first detection node and the ground. The current detection signal is generated at the first detection node.

According to an embodiment of the present invention, the control method further comprises the following steps. A basic voltage is used as DC level to full-wave rectify the integral signal so as to generate the rectified signal. The rectified signal is compared with a first threshold voltage to generate a crossover signal. The basic voltage is equal to a sum of the reference voltage and an offset voltage. The first threshold is slightly higher than the basic voltage.

According to an embodiment of the present invention, the control method further comprises the following steps. A soft-start voltage is gradually increased to the feedback voltage in a predetermined period. The soft-start voltage is converted to a compensation voltage. A sawtooth wave is subtracted from the compensation voltage to generate a compensation signal. When the soft-start voltage is less than the feedback threshold voltage, the compensation voltage is equal to the feedback threshold voltage. When the soft-start voltage is not less than the feedback threshold voltage, the compensation voltage is equal to the soft-start voltage.

According to an embodiment of the present invention, the control method further comprises the following steps. When the rectified signal is less than the first threshold voltage, the crossover signal is set to be a disabled state. When the rectified signal is not less than the first threshold voltage, the crossover signal is set to be an enabled state. In response to the crossover signal changing from the disabled state to the enabled state, a phase signal is set to be in the enabled state. In response to the rectified signal not being less than the compensation signal, the phase signal is set to be in the disabled state during a high-side dead time or a low-side dead time. The low-side dead time is a period after the high-side transistor is turned off and before the low-side transistor is turned on. The high-side dead time is a period after the low-side transistor is turned off and before the high-side transistor is turned on.

According to an embodiment of the present invention, the control method further comprises the following steps. When the high-side transistor is turned on and the phase signal is in the enabled state, the high-side transistor is turned off in response to the rectified signal exceeding the compensation signal. When the high-side transistor is turned off, the low-side transistor is turned on after the low-side dead time. When the low-side transistor is turned on and the phase signal is in the enabled state, the low-side transistor is turned off in response to the rectified signal exceeding the compensation signal. When the low-side transistor is turned off, the high-side transistor is turned on after the high-side dead time.

According to an embodiment of the present invention, the control method further comprises the following steps. An on-time of the high-side transistor and an on-time of the low-side transistor are limited, and do not exceed a maximum enable period.

According to an embodiment of the present invention, the control method further comprises the following steps. The offset voltage is determined based on a difference of the on-time of the high-side transistor and the on-time of the low-side transistor. The offset voltage is configured to adjust the on-time of the high-side transistor and the on-time of the low-side transistor so that the on-time of the high-side transistor is close to the on-time of the low-side transistor.

According to an embodiment of the present invention, the control method further comprises the following steps. The offset voltage is generated by using a voltage across a first resistor. The first resistor is coupled between the reference voltage and the basic voltage. A first current flowing to the basic voltage is provided. An adjust current is sunk from the basic voltage based on the high-side transistor and the low-side transistor being turned on and off, the high-side dead time, and the low-side dead time by using an automatic adjustment circuit. The offset voltage is positive and the basic voltage exceeds the reference voltage in response to the first current not being less than the adjust current. The offset voltage is negative and the basic voltage is less than the reference voltage in response to the first current being less than the adjust current. The basic voltage is equal to the reference voltage in response to the first current being equal to the adjust current.

According to an embodiment of the present invention, the control method further comprises the following steps. A burst mode is operated in response to the feedback voltage being less than a low-power threshold voltage. The feedback voltage decreases in response to the output voltage increasing. The high-side transistor and the low-side transistor are simultaneously turned off during the burst mode. A period of the burst mode increases in response to a decrease in the output power of the output voltage.

According to an embodiment of the present invention, the control method further comprises the following steps. When a current flowing through the resonant capacitor exceeds a predetermined value, the high-side transistor and the low-side transistor are simultaneously turned off. When the current flowing through the resonant capacitor is close to zero, the low-side transistor is turned on. The burst mode starts when the high-side transistor is turned off and ends when the low-side transistor is turned on.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
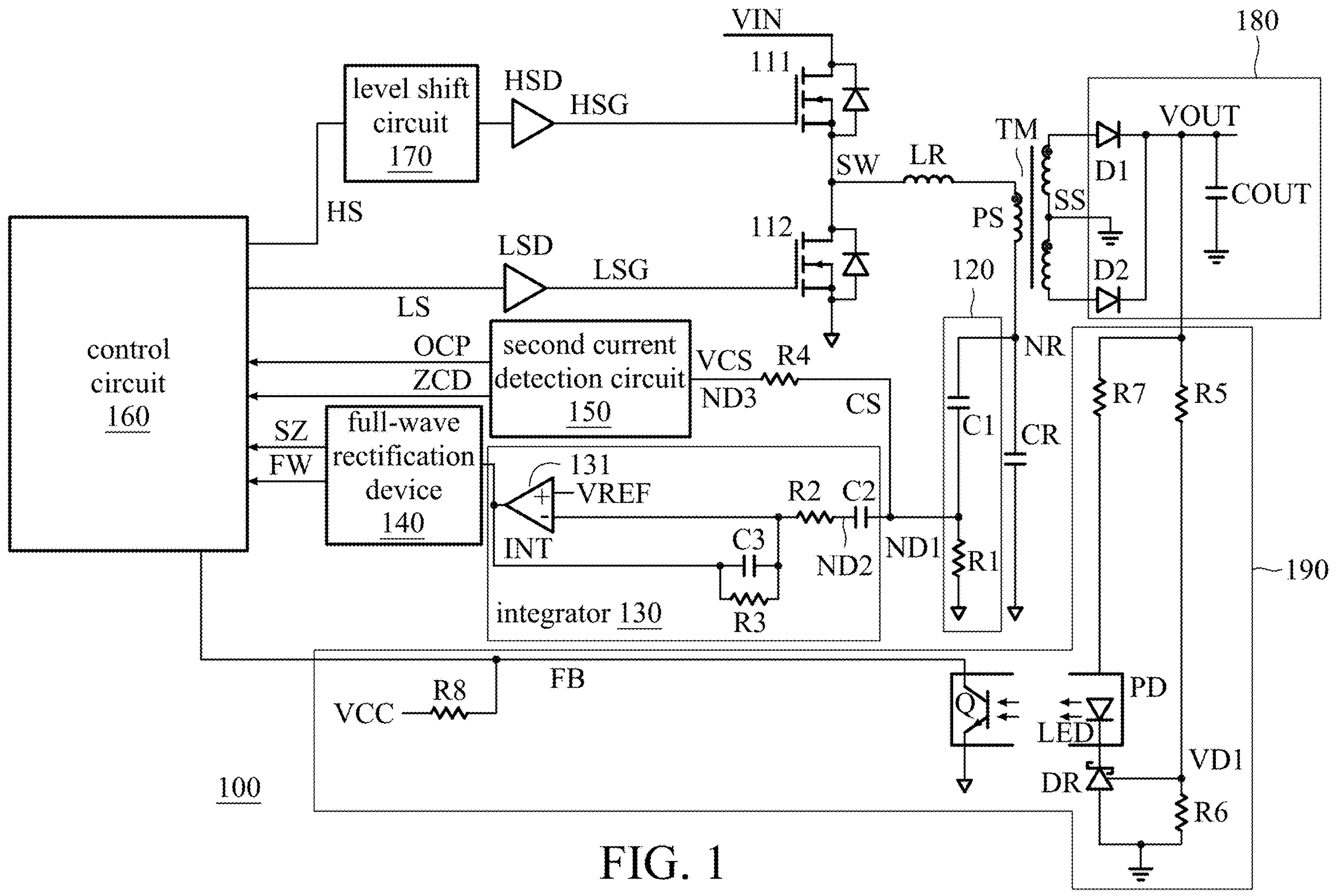
FIG. 1 is a block diagram showing a resonant power conversion circuit in accordance with an embodiment of the present invention.

The following description is made for the purpose of illustrating the general principles of the disclosure and should not be taken in a limiting sense. The scope of the disclosure is determined by reference to the appended claims.

In the following detailed description, for purposes of explanation, numerous specific details and embodiments are set forth in order to provide a thorough understanding of the present disclosure. The use of like and/or corresponding numerals in the drawings of different embodiments does not suggest any correlation between different embodiments.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

In addition, in this specification, relative spatial expressions are used. For example, "lower", "bottom", "higher" or "top" are used to describe the position of one element relative to another. It should be appreciated that if a device is flipped upside down, an element that is "lower" will become an element that is "higher".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section in the specification could be termed a second element, component, region, layer, portion or section in the claims without departing from the teachings of the present disclosure.

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

The terms "approximately", "about" and "substantially" typically mean a value is within a range of +/−20% of the stated value, more typically a range of +/−10%, +/−5%, +/−3%, +/−2%, +/−1% or +/−0.5% of the stated value. The stated value of the present disclosure is an approximate value. Even there is no specific description, the stated value still includes the meaning of "approximately", "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

In the drawings, similar elements and/or features may have the same reference number. Various components of the same type can be distinguished by adding letters or numbers after the component symbol to distinguish similar components and/or similar features.

FIG. 1 is a block diagram showing a resonant power conversion circuit in accordance with an embodiment of the present invention. As shown in FIG. 1, the resonant power conversion circuit 100 includes a transformer TM, a resonant inductor LR, a resonant capacitor CR, an high-side transistor 111, a low-side transistor 112, a first current detection circuit 120, an integrator 130, a full-wave rectification device 140, a fourth resistor R4, a second current detection circuit 150, a control circuit 160, a level shift circuit 170, a high-side driving circuit HSD, a low-side driving circuit LSD, a regulation circuit 180, and a feedback circuit 190.

The transformer TM includes a primary coil PS and a secondary coil SS, where the primary coil PS is coupled to the resonant node NR. The resonant inductor LR is coupled between the switch node SW and the primary coil PS, and the resonant capacitor CR is coupled between the resonant node NR and the ground. According to an embodiment of the present invention, the resonant inductor LR can be replaced by the leakage inductance of the primary coil PS of the transformer TM. In other words, the primary coil PS may be coupled between the switch node SW and the resonant node NR.

The high-side gate driving signal HSG drives the high-side transistor 111 to be conductive or non-conductive, thereby providing the input voltage VIN to the switch node SW. The low-side gate driving signal LSG drives the low-side transistor 112 to be conductive or non-conductive, thereby coupling the switch node SW to the ground. The first current detection circuit 120 includes a first capacitor C1 and a first resistor R1. The first capacitor C1 is coupled between the resonant node NR and the first detection node ND1. The first resistor R1 is coupled between the first detection node ND1 and the ground. According to an embodiment of the present invention, the first current detection circuit 120 generates the current detection signal CS at the first detection node ND1.

The integrator 130 is used to integrate the current detection signal CS of the first detection node ND1 to generate an integral signal INT. As shown in FIG. 1, the integrator 130 includes a second capacitor C2, a second resistor R2, an integrating amplifier 131, a third resistor R3, and a third capacitor C3. The second capacitor C2 is coupled between the first detection node ND1 and the second detection node ND2, and the second resistor R2 is coupled between the second detection node ND2 and the negative input terminal of the integrating amplifier 131. The positive input terminal of the integrating amplifier 131 receives the reference voltage VREF, and the third resistor R3 and the third capacitor C3 are connected in parallel between the output terminal and the negative input terminal of the integrating amplifier 131.

The full-wave rectification device 140 full-wave rectifies the integral signal INT to generate the rectified signal FW and the crossover signal SZ. The fourth resistor R4 is coupled between the first detection node ND1 and the third detection node ND3. The second current detection circuit 150 is coupled to the third detection node ND3 and generates an over-current signal OCP and a zero-current signal ZCD according to the current detection voltage VCS of the third detection node ND3. In other words, the second current detection circuit 150 receives the current detection signal CS through the fourth resistor R4 to generate the over-current signal OCP and the zero-current signal ZCD.

The control circuit 160 generates the high-side driving signal HS and the low-side driving signal LS based on the rectified signal FW, the feedback voltage FB, the over-current signal OCP, and the zero-current signal ZCD. The level shift circuit 170 is used to convert the high-side driving signal HS to the voltage level of the input voltage VIN to generate the high-side gate driving signal HSG through the high-side driving circuit HSD to drive the high-side transistor 111. The low-side driving circuit LSD generates the low-side gate driving signal LSG based on the low-side driving signal HS to drive the low-side transistor 112.

The regulation circuit 180 is coupled to the secondary coil SS and used to convert the current flowing through the secondary coil SS into the output voltage VOUT. As shown in FIG. 1, the regulation circuit 180 includes a first regulation element D1, a second regulation element D2 and an output capacitor COUT. The first regulation element D1 and the second regulation element D2 are used to more efficiently charge the output capacitor COUT with the current flowing through the secondary coil SS, thereby generating the output voltage VOUT. According to other embodiments of the present invention, the first regulation element D1 and the second regulation element D2 can be replaced with electronic components with low on-resistance to further improve the conversion efficiency.

The feedback circuit 190 generates the feedback voltage FB based on the output voltage VOUT. As shown in FIG. 1, the feedback circuit 190 includes a fifth resistor R5, a sixth resistor R6, a voltage stabilizing element DR, an optical coupling element PD, a seventh resistor R7, and an eighth resistor R8. The fifth resistor R5 and the sixth resistor R6 are used to divide the output voltage VOUT to generate the first divided voltage VD1. Based on the first divided voltage VD1, the voltage stabilizing element DR generates a current flowing through the diode LED of the optical coupling element PD to cause the diode LED to emit light, and turns on the transistor Q of the optical coupling element PD through optical coupling.

The seventh resistor R7 is used to limit the current flowing through the diode LED. The supply voltage VCC generates the feedback voltage FB through the eighth resistor R8 and the turned-on transistor Q. According to an embodiment of the present invention, the voltage stabilizing component DR may be TL431. According to some embodiments of the present invention, when the output voltage VOUT increases, the feedback voltage FB decreases accordingly. According to other embodiments of the present invention, when the output voltage VOUT decreases, the feedback voltage FB increases accordingly. The control method of the resonant power conversion circuit 100 will be described in detail in the following paragraphs.

Figure 2:
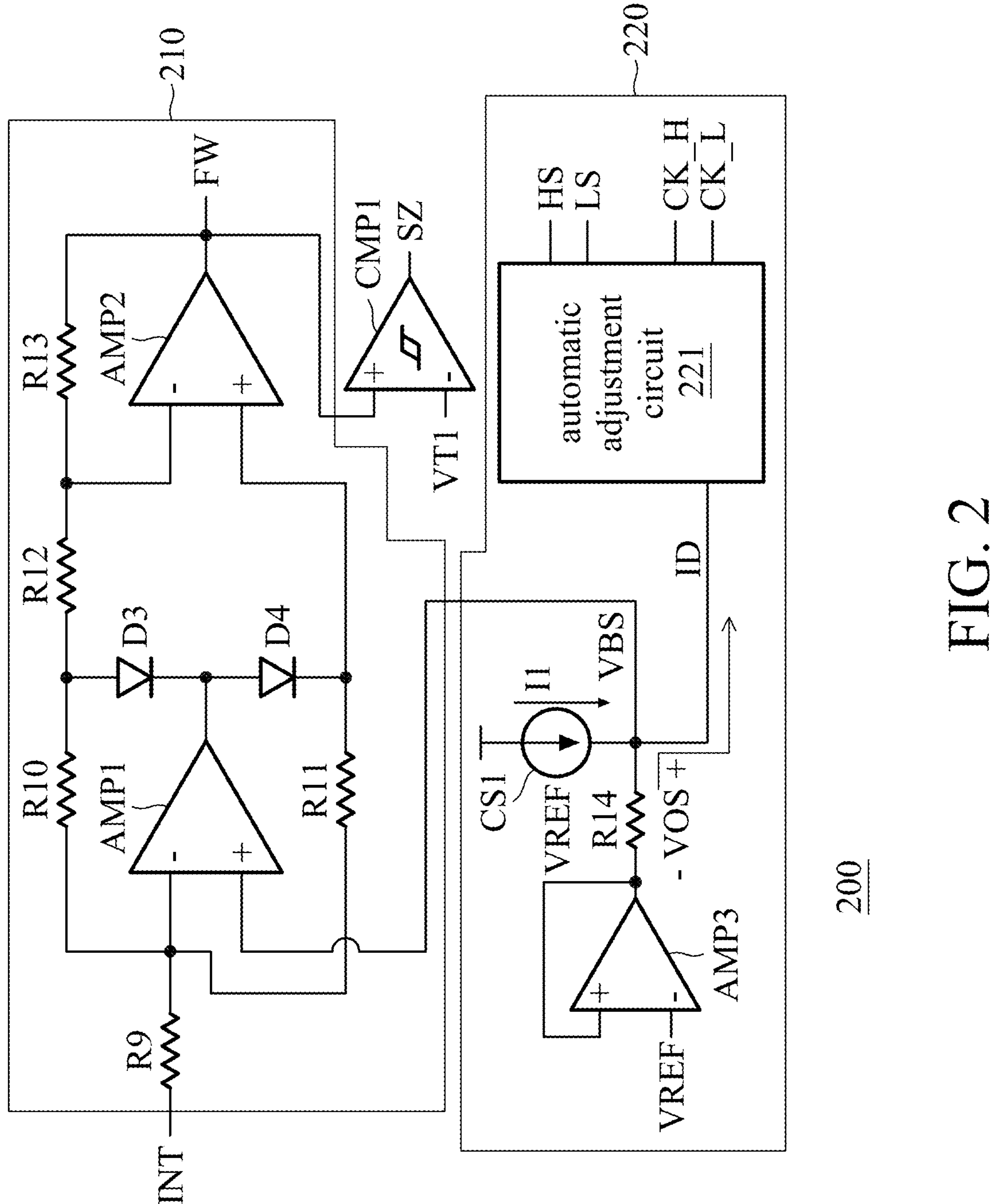
FIG. 2 is a block diagram showing a full-wave rectifier a in accordance with an embodiment of the present invention.

FIG. 2 is a block diagram showing a full-wave rectifier a in accordance with an embodiment of the present invention. According to an embodiment of the present invention, the full-wave rectification device 200 in FIG. 2 corresponds to the full-wave rectification device 140 in FIG. 1. As shown in FIG. 2, the full-wave rectification device 200 includes a full-wave rectifier 210, a first comparator CMP1, and a bias circuit 220. The full-wave rectifier 210 includes a ninth resistor R9, a tenth resistor R10, an eleventh resistor R11, a first amplifier AMP1, a twelfth resistor R12, a thirteenth resistor R13, a third diode D3, a fourth diode D4 and, a second amplifier AMP2. The full-wave rectifier 210 uses the basic voltage VBS as the DC level to perform full-wave rectification on the integral signal INT generated by the integrator 130 to generate the rectified signal FW.

The first comparator CMP1 compares the rectified signal FW with the first threshold voltage VT1 to generate a crossover signal SZ. According to an embodiment of the present invention, the first threshold voltage VT1 is slightly higher than the basic voltage VBS. According to an embodiment of the present invention, when the rectified signal FW is less than the first threshold voltage VT1, the first comparator CMP1 sets the crossover signal SZ to the disabled state. According to another embodiment of the present invention, when the rectified signal FW exceeds the first threshold voltage VT1, the first comparator CMP1 sets the crossover signal SZ to the enabled state.

The bias circuit 220 includes a third amplifier AMP3, a first current source CS1, a fourteenth resistor R14, and an automatic adjustment circuit 221. As shown in FIG. 2, the positive input terminal of the third amplifier AMP3 receives the reference voltage VREF and the third amplifier AMP3 is coupled in the form of a unity gain buffer, so that the voltage of the output terminal of the third amplifier AMP3 is equal to the reference voltage VREF. The first current source CS1 provides the first current I1 to flow to the basic voltage VBS. The fourteenth resistor R14 is coupled between the basic voltage VBS and the output end of the third amplifier AMP3.

The automatic adjustment circuit 221 extracts the adjustment current ID from the basic voltage VBS based on the high-side driving signal HS, the low-side driving signal LS, the high-side dead time signal CK_H, and the low-side dead time signal CK_L. The automatic adjustment circuit 221, the high-side dead time signal CK_H, and the low-side dead time signal CK_L will be described in the following paragraphs. According to an embodiment of the present invention, the basic voltage VBS is equal to the sum of the reference voltage VREF and the offset voltage VOS.

According to an embodiment of the present invention, in response to the first current I1 being greater than the adjustment current ID, the offset voltage VOS is a positive value, and the basic voltage VBS is higher than the reference voltage VREF. According to another embodiment of the present invention, since the first current I1 is less than the adjustment current ID, the offset voltage VOS is a negative value, and the basic voltage VBS is less than the reference voltage VREF. According to another embodiment of the present invention, in response to the first current I1 being equal to the adjustment current ID, the basic voltage VBS is equal to the reference voltage VREF. According to another embodiment of the present invention, in response to the first current I1 being equal to the adjustment current ID, the offset voltage VOS is zero, and the basic voltage VBS is equal to the reference voltage VREF.

Figure 3:
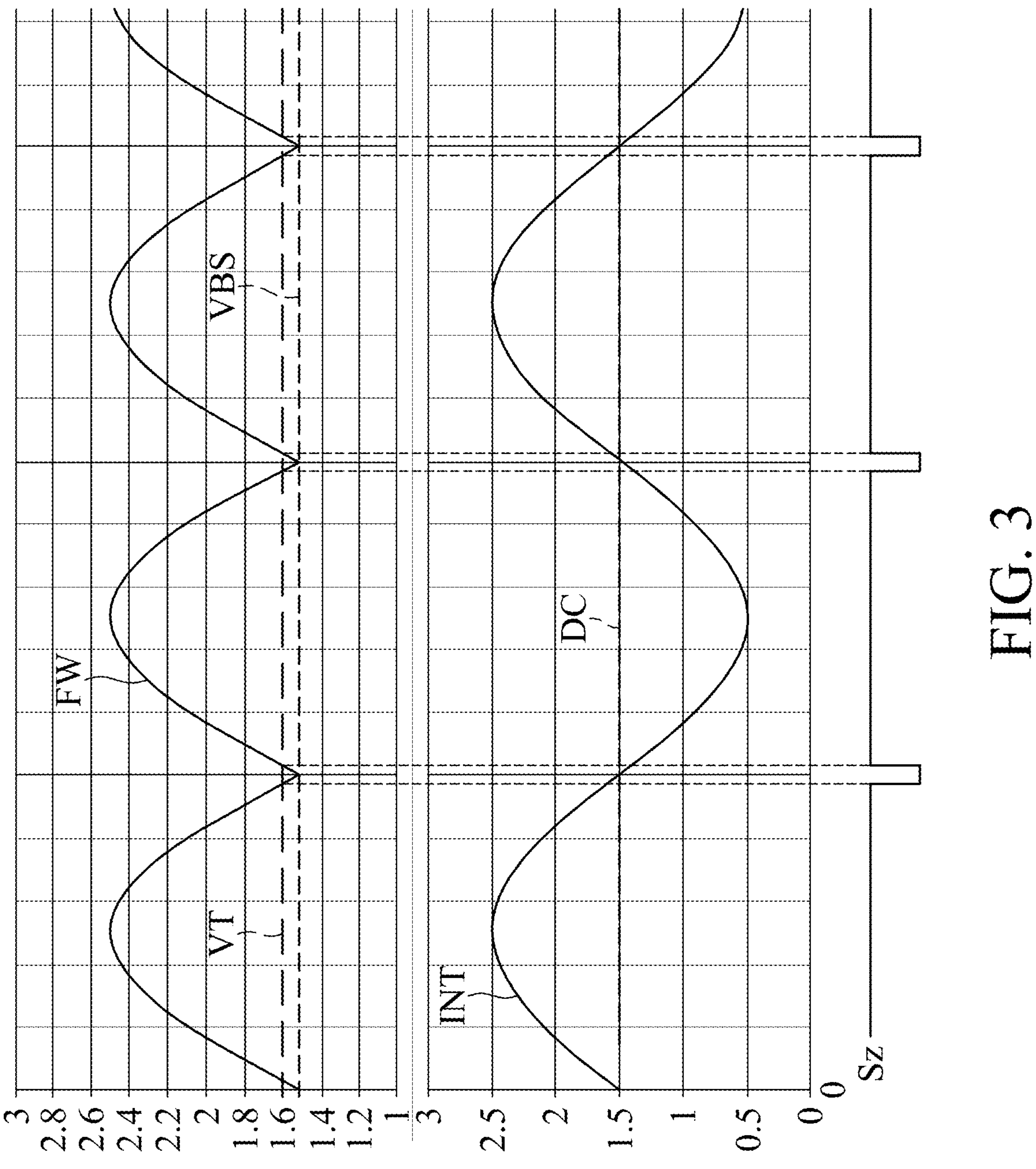
FIG. 3 is a waveform diagram showing the rectified signal and the integral signal in accordance with an embodiment of the present invention.

FIG. 3 is a waveform diagram showing the rectified signal and the integral signal in accordance with an embodiment of the present invention. As shown in FIG. 3, the divided voltage signal SD has a DC level DC, and the full-wave rectifier 210 uses the basic voltage VBS as the DC level to perform full-wave rectification on the integral signal INT to generate the rectified signal FW. Then, the first comparator CMP1 compares the rectified signal FW with the first threshold voltage VT1 to generate the crossover signal SZ. As shown in FIG. 3, when the rectified signal FW is less than the first threshold voltage VT1, the first comparator CMP1 disables the cross signal SZ. When the rectified signal FW is not less than the first threshold voltage VT1, the cross signal SZ is kept in the enabled state.

Figure 4:
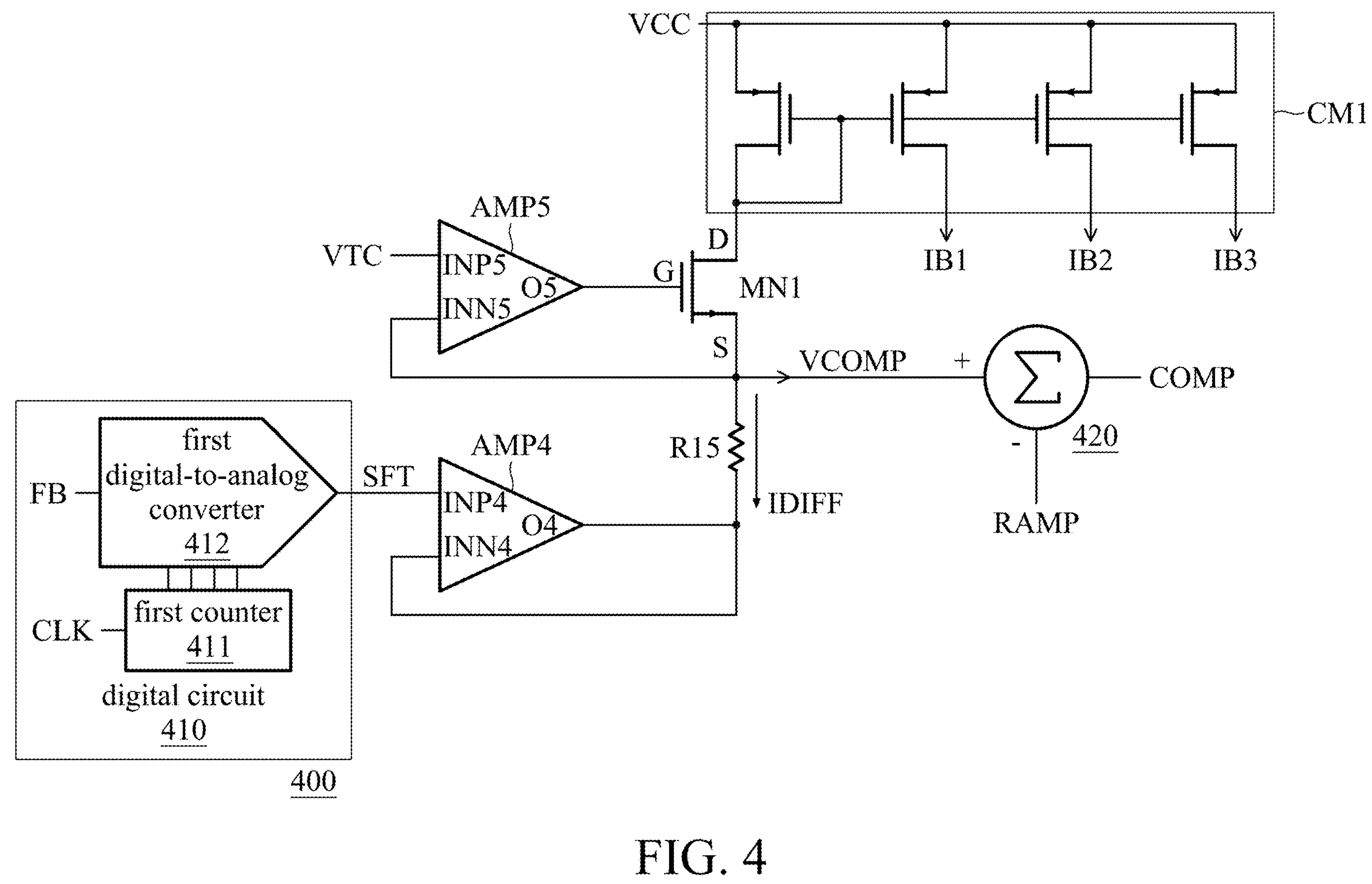
FIG. 4 is a block diagram showing a compensation circuit in accordance with an embodiment of the present invention.

FIG. 4 is a block diagram showing a compensation circuit in accordance with an embodiment of the present invention. According to an embodiment of the present invention, the control circuit 160 in FIG. 1 includes a compensation circuit 400. As shown in FIG. 4, the compensation circuit 400 includes a digital circuit 410, a fourth amplifier AMP4, a fifth amplifier AMP5, a fifteenth resistor R15, a first N-type transistor MN1, a first current mirror CM1, and a summing circuit 420.

The compensation circuit 400 is used to generate the compensation voltage VCOMP based on the feedback voltage FB, and limit the compensation voltage VCOMP to not be less than the feedback threshold voltage VTC. In other words, the compensation voltage VCOMP generated by the compensation circuit 400 is substantially equal to the feedback voltage FB, and the minimum value of the compensation voltage VCOMP is limited to the feedback threshold voltage VTC. In addition, the compensation circuit 400 further subtracts the sawtooth wave RAMP from the compensation voltage VCOMP to generate the compensation signal COMP.

When the resonant power conversion circuit 100 first starts up, the digital circuit 410 is used to gradually increase the soft-start voltage SFT to the feedback voltage FB within a predetermined time. As shown in FIG. 4, the digital circuit 410 includes a first counter 411 and a first digital-to-analog converter 412. The first counter 411 counts from 0 to the maximum value according to the clock signal CLK. The first digital-to-analog converter 412 generates the soft-start voltage SFT according to the count value of the first counter 411 and the feedback voltage FB.

For example, the first counter 411 counts from 0 to 1024 according to the clock signal CLK, and the maximum value of the feedback voltage FB is 5V. Therefore, after each cycle of the clock signal CLK, the soft-start voltage SFT increases by about 5 mV until the soft-start voltage SFT equals the feedback voltage FB. Since the soft-start voltage SFT slowly climbs to the correct voltage value of the feedback voltage FB, the resonant power conversion circuit 100 in FIG. 1 can gradually establish the output voltage VOUT.

The fourth amplifier AMP4 includes a fourth positive input terminal INP4, a fourth negative input terminal INN4, and a fourth output terminal O4, wherein the fourth positive input terminal INP4 receives the soft-start voltage SFT, and the fourth negative input terminal INN4 is coupled to the fourth output terminal O4. The fifth amplifier AMP5 includes a fifth positive input terminal INP5, a fifth negative input terminal INN5, and a fifth output terminal O5, wherein the fifth positive input terminal INP5 receives the feedback threshold voltage VTC. According to an embodiment of the present invention, the fourth amplifier AMP4 is coupled as a unit-gain amplifier, so the voltage of the fourth output terminal O4 is equal to the soft-start voltage SFT.

The fifteenth resistor R15 is coupled between the fifth negative input terminal INN5 and the fourth output terminal O4, and generates a differential current IDIFF. The first N-type transistor MN1 includes a gate terminal G, a drain terminal D, and a source terminal S. The gate terminal G is coupled to the fifth output terminal O5. The source terminal S is coupled to the fifth negative input terminal INN5 and generates the compensation voltage VCOMP. The summing circuit 420 is used to subtract the sawtooth wave RAMP from the compensation voltage VCOMP to generate the compensation signal COMP.

The first current mirror CM1 is coupled to the drain terminal D, and maps the difference current IDIFF into a first mapping current IB1, a second mapping current IB2, and a third mapping current IB3. According to some embodiments of the present invention, the first mapping current IB1, the second mapping current IB2, and the third mapping current IB3 are N, M, and P times of the difference current IDIFF respectively, where N, M and P are the mapping ratios of the first currents mirror CM1, and N, M, and P can be the same or different.

According to an embodiment of the present invention, when the soft-start voltage SFT is less than the feedback threshold voltage VTC, the difference between the feedback threshold voltage VTC and the soft-start voltage SFT and the resistance value of the fifteenth resistor R15 generate a differential current IDIFF. The first current mirror CM1 generates the first mapping current IB1, the second mapping current IB2 and the third mapping current IB3, and the compensation voltage VCOMP is equal to the feedback threshold voltage VTC. According to another embodiment of the present invention, when the soft-start voltage SFT is higher than or equal to the feedback threshold voltage VTC, the fifth amplifier AMP5 does not turn on the first N-type transistor MN1 so that the first current mirror CM1 does not generate the first mapping current IB1, the second mapping current IB2, and the third mapping current IB3, and the compensation voltage VCOMP is equal to the soft-start voltage SFT.

In other words, when the soft-start voltage SFT is less than the feedback threshold voltage VTC, the compensation voltage VCOMP is equal to the feedback threshold voltage VTC, and the first mapping current IB1, the second mapping current IB2, and the third mapping current IB3 are correspondingly generated. When the soft-start voltage SFT is not less than the feedback threshold voltage VTC, the compensation voltage VCOMP is equal to the soft-start voltage SFT, and the first mapping current IB1, the second mapping current IB2, and the third mapping current IB3 are not generated. The functions of the first mapping current IB1, the second mapping current IB2, and the third mapping current IB3 will be described in the following paragraphs.

Figure 5:
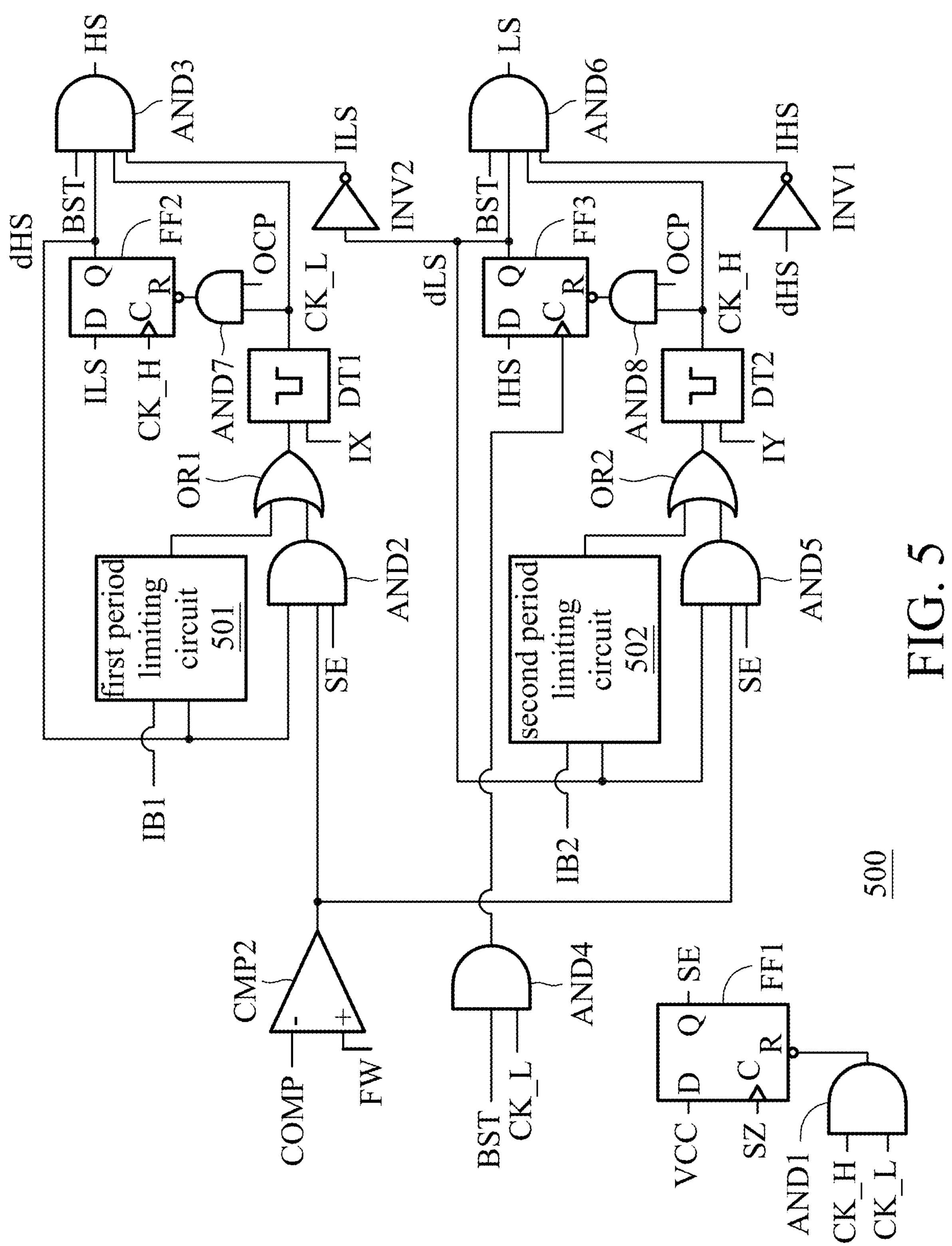
FIG. 5 is a block diagram showing a control circuit in accordance with an embodiment of the present invention.

FIG. 5 is a block diagram showing a control circuit in accordance with an embodiment of the present invention. As shown in FIG. 5, the control circuit 500 includes a first flip-flop FF1 and a first AND gate AND1. The first flip-flop FF1 outputs the supply voltage VCC as the phase signal SE (that is, the phase signal SE is set to the enabled state) based on the positive signal edge of the crossover signal SZ (that is, the crossover signal SZ changes from the disabled state to the enabled state). According to some embodiments of the present invention, the crossover signal SZ at a low logic level is in a disabled state, and the crossover signal SZ at a high logic level is in an enabled state. In other words, as shown in FIG. 2, when the rectified signal FW increases to exceed the first threshold voltage VT1, the phase signal SE is enabled.

The first flip-flop FF1 further sets the phase signal SE to a disabled state based on the high-side dead time signal CK_H or the low-side dead time signal CK_L being in the disabled state (i.e., a low logic level). In other words, during the high-side dead time and the low-side dead time, the phase signal SE is in the disabled state. As shown in FIG. 5, the control circuit 500 further includes a second comparator CMP2, a second AND gate AND2, a first OR gate OR1, a first dead time generator DT1, a second flip-flop FF2, and a third AND gate AND3.

When the rectified signal FW exceeds the compensation voltage COMP generated by the compensation circuit 400, the delayed high-side driving signal dHS is in the enabled state, and the phase signal SE is in the enabled state, a negative pulse is generated on the low-side dead time signal CK_L by triggering the first dead time generator DT1 through the second AND gate AND2 and the first OR gate OR1, and the high-side driving signal HS is set to the disabled state through the third AND gate AND3, thereby turning off the high-side transistor 111 in FIG. 1.

In addition, the negative pulse of the low-side dead time signal CK_L resets the second flip-flop FF2, causing the delayed high-side driving signal dHS to be reset to the disabled state. According to an embodiment of the present invention, the width of the negative pulse of the low-side dead time signal CK_L is configured to determine the low-side dead time of the low-side transistor 112. According to an embodiment of the present invention, the first adjustment current IX is configured to adjust the length of the low-side dead time.

As shown in FIG. 5, the control circuit 500 further includes a first inverter INV1, a fourth AND gate AND4, a third flip-flop FF3, a fifth AND gate AND5, a second OR gate OR2, a second dead time generator DT2, and sixth AND gate AND6. The first inverter INV1 inverts the delayed high-side driving signal dHS in the disabled state and sets the initial high-side driving signal IHS to the enabled state. When the low-side dead time signal CK_L changes from the disabled state (negative pulse) to the enabled state and the burst signal BST is in the disabled state (the high logic level in the embodiment of FIG. 5), the third flip-flop FF3 outputs the initial high-side driving signal IHS in the enabled state as the delayed low-side driving signal dLS (that is, in the enabled state).

Then, when the delayed low-side driving signal dLS is in the enabled state, the rectified signal FW exceeds the compensation signal COMP, and the phase signal SE is in the enabled state, the second dead time generator DT2 is triggered to generate a negative pulse on the high-side dead time signal CK_H through the fifth AND gate AND5 and the second OR gate OR2, and the low-side driving signal LS is set to the disabled state through the sixth AND gate AND6, thereby turning off the low-side transistor 112 in FIG. 1. In addition, the negative pulse of the high-side dead time signal CK_H resets the third flip-flop FF3, causing the delayed low-side driving signal dLS to be in the disabled state. According to an embodiment of the present invention, the width of the negative pulse of the high-side dead time signal CK_H is configured to determine the high-side dead time of the high-side transistor 111. According to an embodiment of the present invention, the second adjustment current IY is configured to adjust the length of the high-side dead time.

As shown in FIG. 5, the control circuit 500 further includes a first period limiting circuit 501, a second period limiting circuit 502, and a second inverter INV2. When the enable period of the high-side driving signal HS exceeds the maximum enable period, the first period limit circuit 501 sends an enable signal based on the first mapping current IB1 generated by the compensation circuit 400 to trigger the first dead time generator DT1 to generate a negative pulse to reset (or disable) the delayed high-side driving signal dHS, thereby disabling the high-side driving signal HS. According to an embodiment of the present invention, during the enable period of the high-side driving signal HS, the high-side transistor 111 is turned on; during the enable period of the low-side driving signal LS, the low-side transistor 112 is turned on.

When the enable period of the low-side driving signal LS exceeds the maximum enable period, the second period limit circuit 502 sends an enable signal based on the second mapping current IB2 generated by the compensation circuit 400 to trigger the generation of the second dead time generator DT2 to generate a negative pulse to reset or disable the delayed low-side driving signal dLS, thereby disabling the low-side driving signal LS. The second inverter INV2 is used to invert the delayed low-side driving signal dLS to generate the initial low-side driving signal ILS.

As shown in FIG. 5, the control circuit 500 further includes a seventh AND gate AND7 and an eighth AND gate AND8. The seventh AND gate AND7 is used to perform a logical AND operation on the low-side dead time signal CK_L and the over-current signal OCP to reset the second flip-flop FF2. Specifically, when the low-side dead time signal CK_L is at a low logic level (i.e., negative pulse) or the over-current signal OCP is at a low logic level (i.e., negative pulse), the delayed high-side driving signal dHS is reset to the disabled state.

The eighth AND gate AND8 is used to perform a logical AND operation on the high-side dead time signal CK_H and the overcurrent signal OCP to reset the third flip-flop FF3. Specifically, when the high-side dead time signal CK_H is in a negative pulse state or the overcurrent signal OCP is in a negative pulse state, the delayed low-side driving signal dLS is reset to the disabled state.

Figure 6:
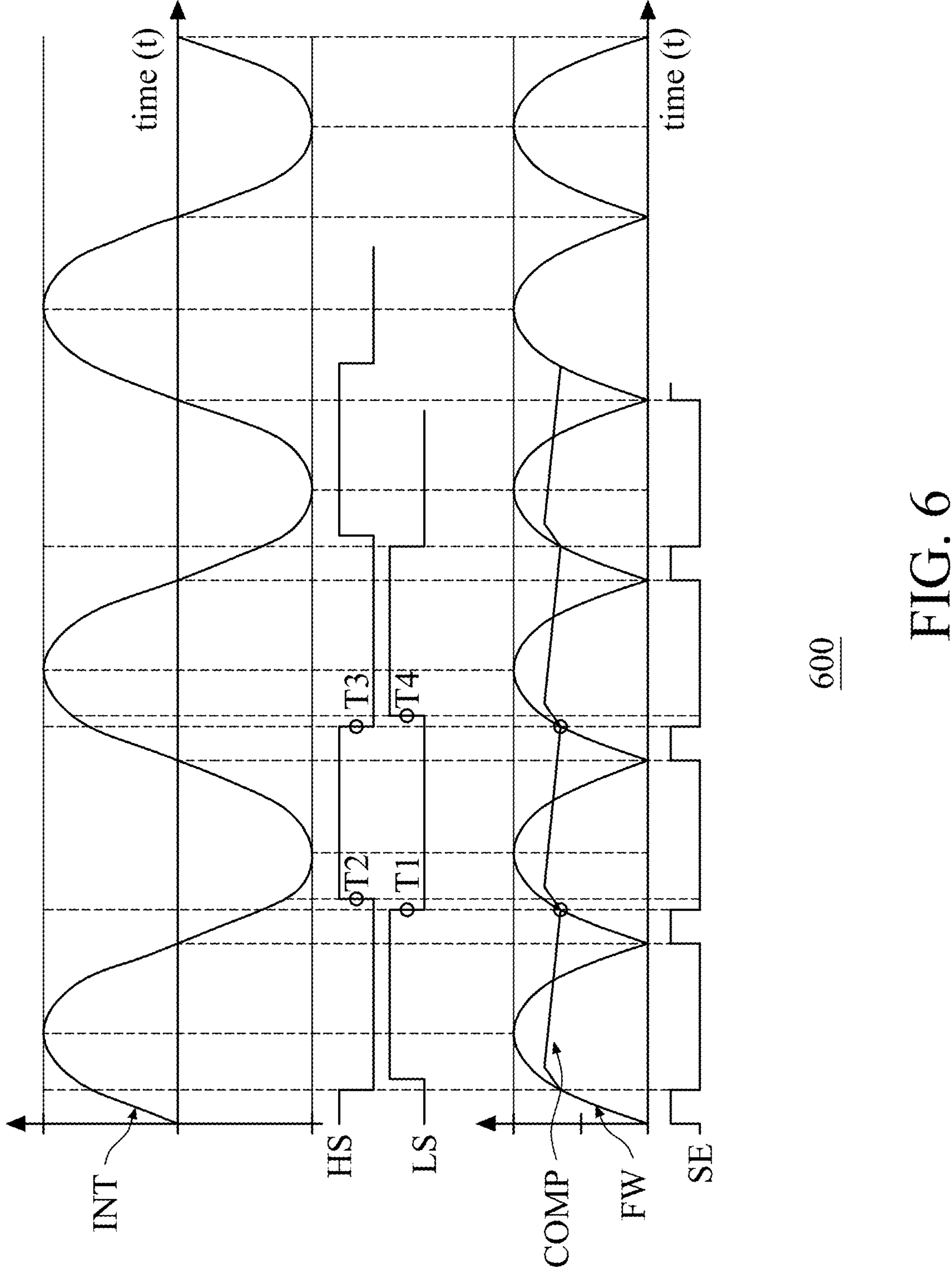
FIG. 6 is a waveform diagram showing a control circuit in accordance with an embodiment of the present invention.

FIG. 6 is a waveform diagram showing a control circuit in accordance with an embodiment of the present invention. A detailed explanation will be described below in conjunction with the control circuit 500 in FIG. 5 and the waveform diagram 600 in FIG. 6.

At the first time point T1 in FIG. 6, the low-side driving signal LS is in the enabled state and the rectification signal FW keeps increasing to exceed the compensation signal COMP. As shown in FIG. 5, since the rectified signal FW exceeds the compensation signal COMP, the output of the second comparator CMP2 triggers the second dead time generator DT2 to generate a negative pulse on the high-side dead time signal CK_H through the fifth AND gate AND5 and the second OR gate OR2, and the negative pulse of the high-side dead time signal CK_H resets the first flip-flop FF1 and disables the phase signal SE. In addition, the negative pulse of the high-side dead time signal CK_H disables the low-side driving signal LS through the sixth AND gate AND6 at the same time.

According to an embodiment of the present invention, when the high-side dead time signal CK_H is in a disabled state, that is, between the first time point T1 and the second time point T2, the third flip-flop FF3 is reset to disable the delayed low-side driving signal dLS. Furthermore, the disabled delayed low-side driving signal dLS passes through the fifth AND gate AND5 and the second OR gate OR2 to stop the second dead time generator DT2 keeping disabling the high-side dead time signal CK_H, thereby ending the high-side dead time and going to the second time point T2.

At the second time point T2 in FIG. 6, the high-side dead time signal CK_H goes back to the enabled state from the negative pulse. That is, the high-side dead time signal CK_H generates a positive signal edge at the second time T2, so that the second flip-flop FF2 outputs the initial low-side driving signal ILS in the enabled state as the delayed high-side driving signal dHS, and sets the high-side driving signal HS to the enabled state through the third AND gate AND3.

At the third time point T3 in FIG. 6, the high-side driving signal HS continues to be in the enabled state, and the rectified signal FW continues to increase and just exceeds the compensation signal COMP. As shown in FIG. 5, since the rectified signal FW increases to exceed the compensation signal COMP, the output of the second comparator CMP2 triggers the first dead time generator DT1 through the second AND gate AND2 and the first OR gate OR1. The low-side dead time signal CK_L generates a negative pulse, and the negative pulse of the low-side dead time signal CK_L resets the first flip-flop FF1 and disables the phase signal SE. In addition, the negative pulse of the low-side dead time signal CK_L passes through the third AND gate AND3 to disable the high-side driving signal HS at the same time.

According to an embodiment of the present invention, when the low-side dead time signal CK_L is in the disabled state, the second flip-flop FF2 is reset to disable the delayed high-side driving signal dHS, and the disabled delayed high-side drive signal dHS passes through the second AND gate AND2 and the first OR gate OR1 to stop the first dead time generator DT1 keeping disabling the low-side dead time signal CK_L, so that the low-side dead time signal CK_L returns to the enabled state.

At the fourth time point T4 in FIG. 6, the low-side dead time signal CK_L returns to the enabled state from the negative pulse. That is, the low-side dead time signal CK_L generates a positive signal edge at the fourth time point T4, plus the burst signal BST is in the disabled state (i.e., the high logic level), so that the third flip-flop FF3 outputs the initial high-side driving signal IHS in the enabled state as the delayed low-side driving signal dLS, and sets the low-side driving signal LS to the enabled state through the sixth AND gate AND6.

Figure 7:
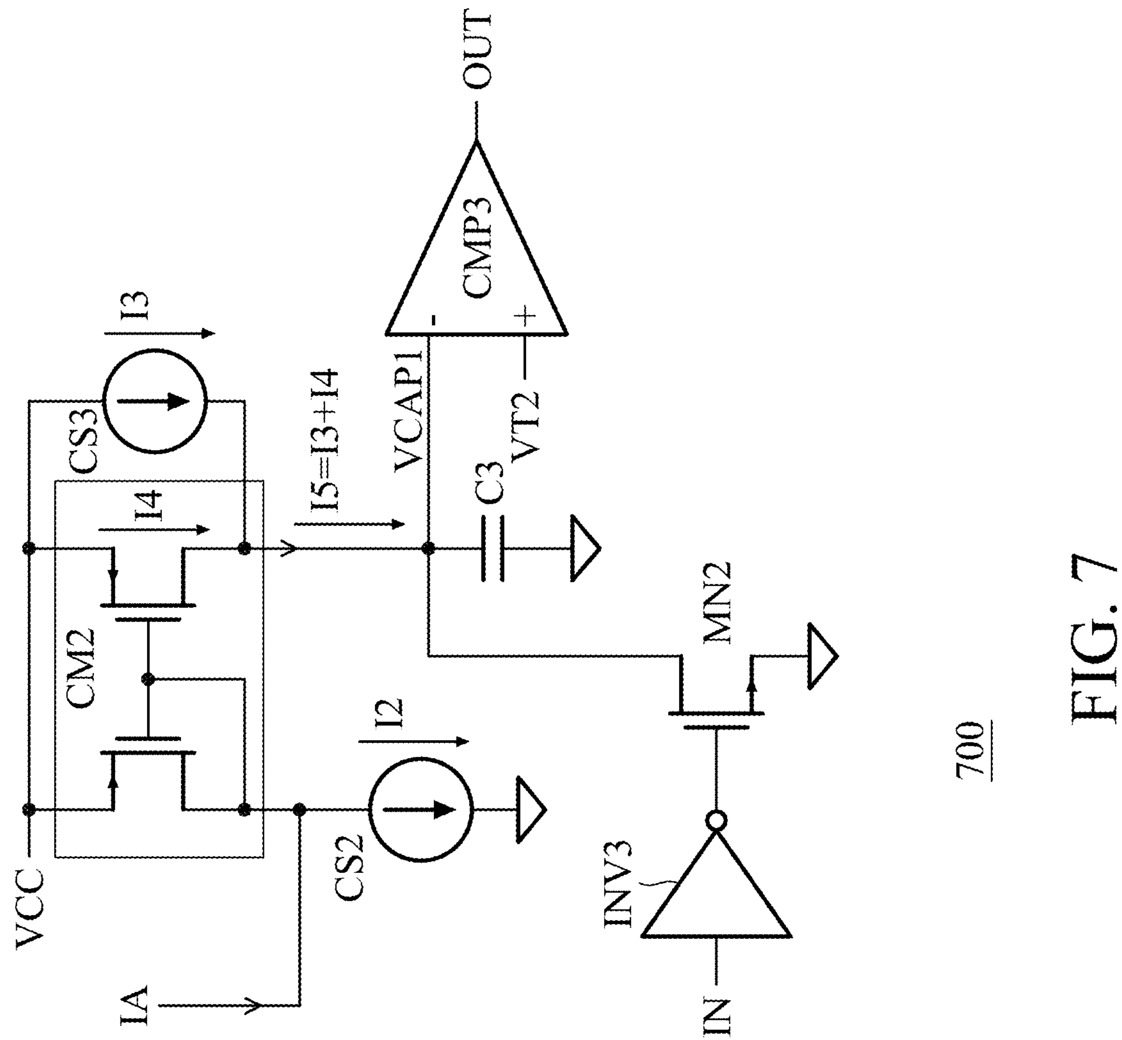
FIG. 7 is a circuit diagram showing a delay time generator in accordance with an embodiment of the present invention.

FIG. 7 is a circuit diagram showing a dead time generator in accordance with an embodiment of the present invention. According to an embodiment of the present invention, the delay time generator 700 in FIG. 7 corresponds to the first dead time generator DT1 and the second dead time generator DT2 in FIG. 5.

As shown in FIG. 7, the delay time generator 700 includes a third inverter INV3, a second N-type transistor MN2, a third capacitor C3, a second current source CS2, a second current mirror CM2, a third current source CS3, and a third comparator CMP3.

When the input signal IN received by the third inverter INV3 is in a disabled state, the second N-type transistor MN2 is turned on to couple the first capacitor voltage VCAP1 generated by the third capacitor C3 to the ground. When the third inverter INV3 then receives the input signal IN in the enabled state, the second N-type transistor MN2 is turned off, and the second current mirror CM2 maps the second current I2 generated by the second current source CS2 to the fourth current I4. In addition, since the third current I3 generated by the third current source CS3 in parallel with the second current mirror CM2 is added, the third capacitor C3 is charged by the fifth current I5 to generate the first capacitor voltage VCAP1. According to an embodiment of the present invention, the fifth current I5 is the sum of the third current I3 and the fourth current I4.

When the first capacitor voltage VCAP1 exceeds the second threshold voltage VT2, the third comparator CMP3 generates an output signal OUT in a disabled state. When the input signal IN returns to the disabled state again, the second N-type transistor MN2 is turned on to discharge the first capacitor voltage VCAP1 to the ground, so that the output signal OUT generated by the third comparator CMP3 returns to the enabled state again. According to an embodiment of the present invention, the length of the charging time is determined based on the fifth current I5 and the capacitance value of the third capacitor C3.

According to an embodiment of the present invention, when the input current IA is additionally provided to the second current source CS2, the magnitude of the fourth current I4 is reduced, thereby reducing the fifth current I5 for charging the third capacitor C3. Therefore, the period of the output signal OUT remaining in the disabled state is extended. In other words, by increasing the magnitude of the input current IA, the duration of the negative pulse of the output signal OUT can be adjusted. According to some embodiments of the present invention, the input current IA in FIG. 7 corresponds to the first adjustment current IX and the second adjustment current IY in FIG. 5.

Figure 8:
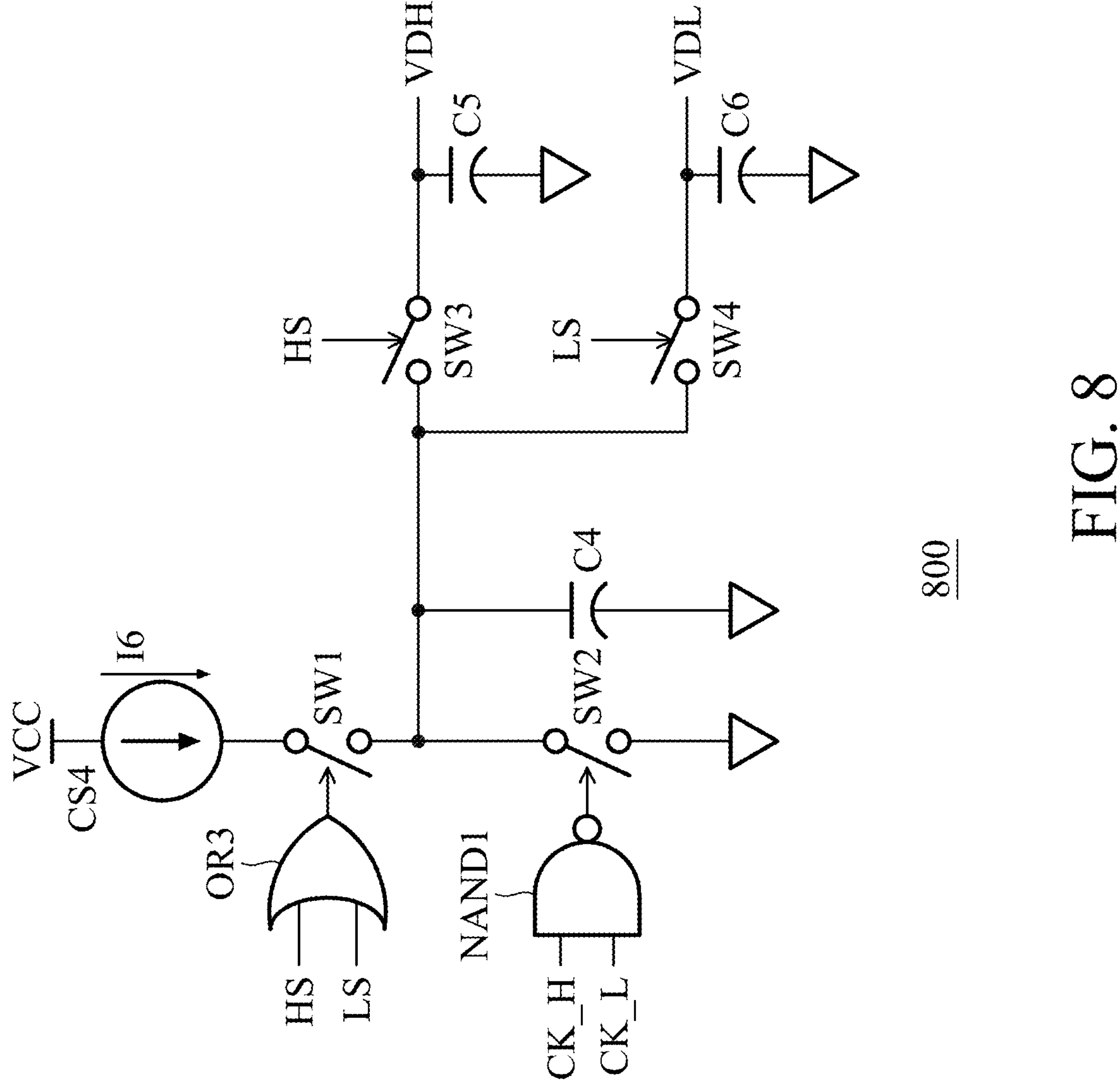
FIG. 8 is a schematic diagram showing a time-to-voltage conversion circuit in accordance with an embodiment of the present invention.

FIG. 8 is a schematic diagram showing a time-to-voltage conversion circuit in accordance with an embodiment of the present invention. According to an embodiment of the present invention, the automatic adjustment circuit 221 in FIG. 2 includes a time-to-voltage conversion circuit 800. As shown in FIG. 8, the time-to-voltage conversion circuit 800 includes a fourth current source CS4, a third OR gate OR3, a first switch SW1, a first NAND gate NAND1, a second switch SW2, a fourth capacitor C4, a third switch SW3, a fifth capacitor C5, a fourth switch SW4, and a sixth capacitor C6.

The fourth current source CS4 generates the fourth current I4, and the third OR gate OR3 performs a logical OR operation on the high-side driving signal HS and the low-side driving signal LS to turn on the first switch SW1, so that the sixth current I6 charges the fourth capacitors C4. The first NAND gate NAND1 performs a logical NAND operation on the high-side dead time signal CK_H and the low-side dead time signal CK_L to turn on the second switch SW2, causing the fourth capacitor C4 to discharge to the ground.

The high-side driving signal HS controls the third switch SW3, so that the sixth current I6 charges the fifth capacitor C5 to generate the high-side enable-period voltage VDH. The low-side driving signal LS controls the fourth switch SW4 so that the sixth current I6 can charge the sixth capacitor C6 to generate the low-side enable-period voltage VDL.

In other words, when the high-side driving signal HS is in the enabled state, the sixth current I6 charges the fourth capacitor C4 and the fifth capacitor C5. When the low-side driving signal LS is in the enabled state, the sixth current I6 charges the fourth capacitor C4 and the sixth capacitor C6. During the high-side dead time and the low-side dead time, the fourth capacitor C4 is discharged, and the charge stored in the fourth capacitor C4 is cleared. Therefore, the high-side enable-period voltage VDH represents the enable period of the high-side driving signal HS, and the low-side enable-period voltage VDL represents the enable period of the low-side driving signal LS.

Figure 9:
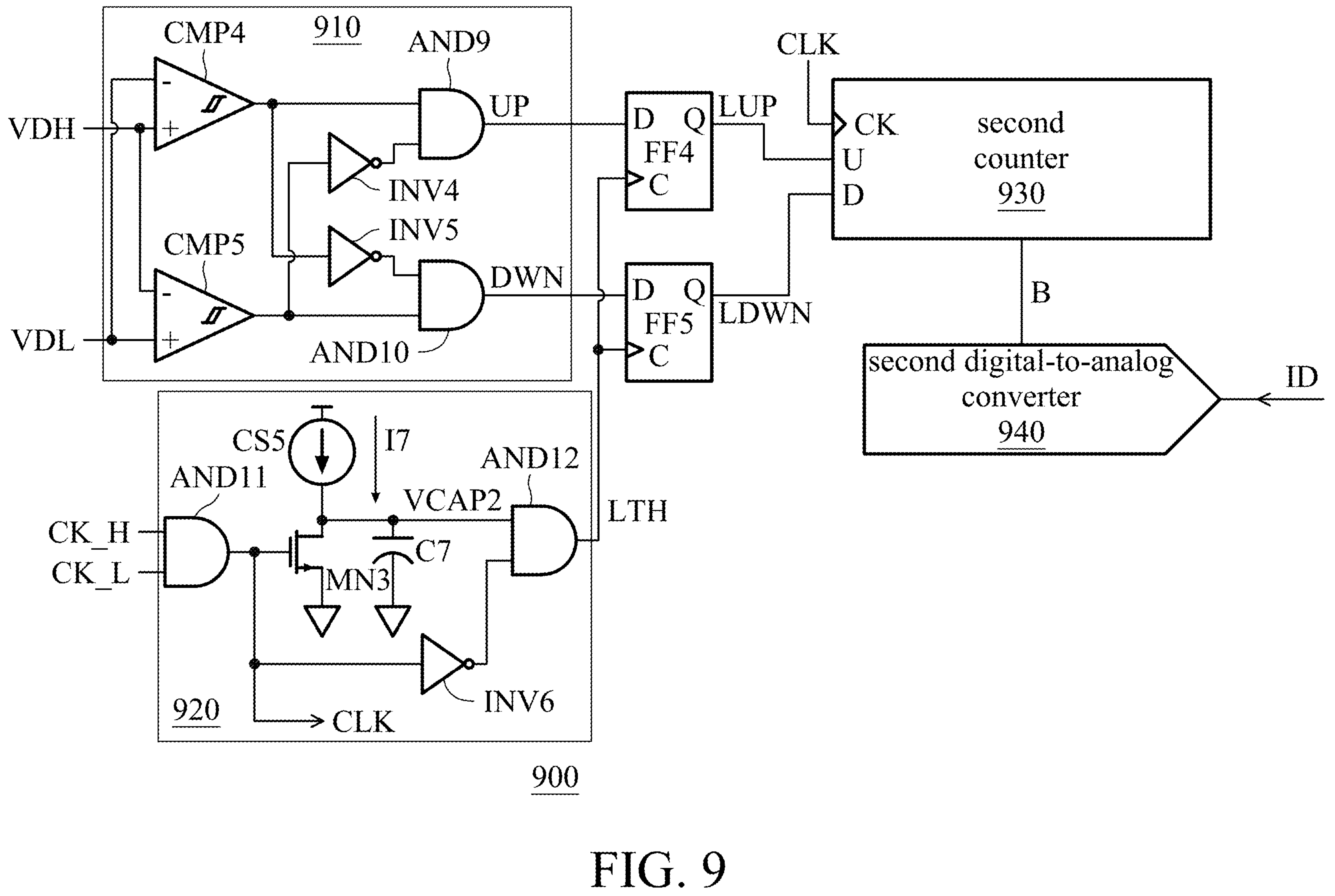
FIG. 9 is a schematic diagram showing an automatic adjustment circuit in accordance with an embodiment of the present invention.

FIG. 9 is a schematic diagram showing an automatic adjustment circuit in accordance with an embodiment of the present invention. According to an embodiment of the present invention, the automatic adjustment circuit 900 corresponds to the automatic adjustment circuit 221 in FIG. 2.

As shown in FIG. 9, the automatic adjustment circuit 900 includes a comparison circuit 910, a signal generation circuit 920, a fourth flip-flop FF4, a fifth flip-flop FF5, a second counter 930, and a second digital-to-analog converter 940. The comparison circuit 910 is configured to compare the high-side enable-period voltage VDH and the low-side enable-period voltage VDL to generate an up-count signal UP and a down-count signal DWN.

The signal generation circuit 920 generates the clock signal CLK and the latch signal LTH based on the high-side dead time signal CK_H and the low-side dead time signal CK_L. The fourth flip-flop FF4 latches the up-count signal UP based on the latch signal LTH to be the latched up-count signal LUP. The fifth flip-flop FF5 latches the down-count signal DWN based on the latch signal LTH to be the latched down-count signal LDWN. The second counter 930 counts the digital code B based on the clock signal CLK. When the latched up-count signal LUP is in the enabled state and the latched down-count signal LDWN is in the disabled state, the second counter 930 up-counts the digital code B. When the latched up-count signal LUP is in a disabled state and the latched down-count signal LDWN is in an enabled state, the second counter 930 down-counts the digital code B.

As shown in FIG. 9, the comparison circuit 910 includes a fourth comparator CMP4, a fifth comparator CMP5, a fourth inverter INV4, a fifth inverter INV5, a ninth AND gate AND9, and a tenth AND gate AND10. When the high-side enable-period voltage VDH exceeds the low-side enable-period voltage VDL, the output of the fourth comparator CMP4 is in the enabled state and the output of the fifth comparator CMP5 is in the disabled state. When the high-side enable-period voltage VDH does not exceed the low-side enable-period voltage VDL, the output of the fourth comparator CMP4 is in the disabled state and the output of the fifth comparator CMP5 is in the enabled state. Then, the up-count signal UP and the down-count signal DWN are generated through the fourth inverter INV4, the fifth inverter INV5, the ninth AND gate AND9, and the tenth AND gate AND10.

In other words, when the high-side enable-period voltage VDH exceeds the low-side enable-period voltage VDL, the up-count signal UP is in the enabled state and the down-count signal DWN is in the disabled state. When the high-side enable-period voltage VDH does not exceed the low-side enable-period voltage VDL, the up-count signal UP is in the disabled state and the down-count signal DWN is in the enabled state. That is, when the enable period of the high-side driving signal HS exceeds the enable period of the low-side driving signal LS, the second counter 930 up-counts the digital code B to cause the second digital-to-analog converter 940 to increase the adjustment current ID. When the enable period of the high-side driving signal HS does not exceed the enable period of the low-side driving signal LS, the second counter 930 down-counts the digital code B to cause the second digital-to-analog converter 940 to reduce the adjustment current ID.

The signal generating circuit 920 includes an eleventh AND gate AND11, a fifth current source CS5, a third N-type transistor MN3, a seventh capacitor C7, a sixth inverter INV6, and a twelfth N-type gate AND12. The eleventh AND gate AND11 performs a logical AND operation on the high-side dead time signal CK_H and the low-side dead time signal CK_L to generate the clock signal CLK. When either the high-side dead time signal CK_H or the low-side dead time signal CK_L is in a negative pulse, the clock signal CLK is in the disabled state, the seventh current I7 of the fifth current source CS5 charges the seventh capacitor C7 to generate the second capacitor voltage VCAP2, and the sixth inverter INV6 inverts the clock signal CLK, causing the latch signal LTH output by the twelfth N-type gate AND12 to generate a positive signal edge, thereby triggering the fourth flip-flop FF4 and the fifth flip-flop FF5 to latch the up-count signal UP and the down-count signal DWN respectively.

According to an embodiment of the present invention, when the enable period of the high-side driving signal HS exceeds the enable period of the low-side driving signal LS, the adjustment current ID is increased to increase the offset voltage VOS and the basic voltage VBS, thereby shortening the enable period of the high-side driving signal HS and extending the enable period of the low-side driving signal LS. According to another embodiment of the present invention, when the enable period of the high-side driving signal HS does not exceed the enable period of the low-side driving signal LS, the adjustment current ID is reduced to reduce the offset voltage VOS and the basic voltage VBS, thereby extending the high-side driving signal LS and shortening the enable period of the low-side driving signal LS. In other words, by adjusting the basic voltage VBS, the enable period of the high-side driving signal HS is close to the enable period of the low-side driving signal LS.

Figure 10:
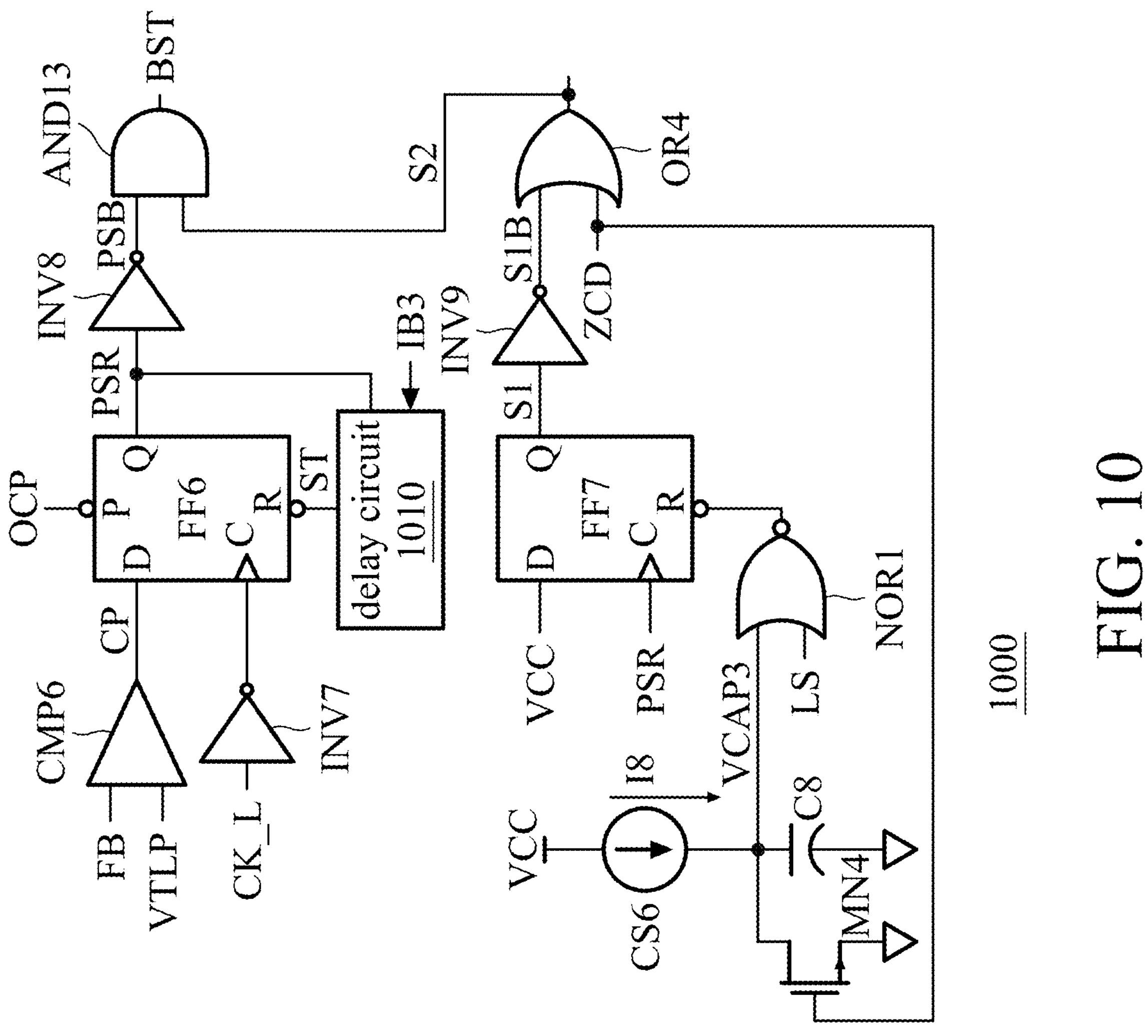
FIG. 10 is a block diagram showing an output voltage detection circuit in accordance with an embodiment of the present invention.

FIG. 10 is a block diagram showing an output voltage detection circuit in accordance with embodiment of the present invention. According to an embodiment of the present invention, the control circuit 160 in FIG. 1 further includes an output voltage detection circuit 1000. As shown in FIG. 10, the output voltage detection circuit 1000 includes a sixth comparator CMP6, a sixth flip-flop FF6, a seventh inverter INV7, an eighth inverter INV8, and a delay circuit 1010.

The sixth comparator CMP6 compares the feedback voltage FB to the low-power threshold voltage VTLP to generate a comparison signal CP. According to an embodiment of the present invention, when the output voltage VOUT in FIG. 1 increases, the feedback voltage FB decreases, and the increase in the output voltage VOUT represents a decrease in the output power. In other words, when the comparison signal CP in FIG. 10 is at the high logic level, it means that the output power is too low.

The seventh inverter INV7 inverts the low-side dead time signal CK_L, and triggers the sixth flip-flop FF6 to output the comparison signal CP as the pre-burst signal PSR, and generates the inverted preamble burst signal PSB through the eighth inverter INV8. The sixth flip-flop FF6 outputs the comparison signal CP as the pre-burst signal PSR according to the positive signal edge of the output signal of the seventh inverter INV7. In addition, when the over-current signal OCP is at a low logic level, the pre-burst signal PSR is set to the enabled state; when the reset signal ST is at the low logic level, the pre-burst signal PSR is set to the disabled state.

After receiving the inverted preamble burst signal PSB at the high logic level, the delay circuit 1010 delays a delay time to generate the reset signal ST to reset the preamble burst signal PSR, and the third mapping current IB3 in FIG. 4 is used to adjust the delay time of the delay circuit 1010. According to an embodiment of the present invention, the delay circuit 1010 can be implemented by the delay time generator 700 in FIG. 7, where the pre-burst signal PSR corresponds to the input signal IN in FIG. 7, and the reset signal ST corresponds to the output signal OUT in FIG. 7, the detailed operation will not be repeated herein.

As shown in FIG. 10, the output voltage detection circuit 1000 further includes a fourth N-type transistor MN4, a sixth current source CS6, an eighth capacitor C8, a first NOR gate NOR1, a seventh flip-flop FF7, a ninth inverter INV9, a fourth OR gate OR4, and a thirteenth AND gate AND13.

The fourth N-type transistor MN4 is controlled by the zero-current signal ZCD to discharge the third capacitor voltage VCAP3 to the ground. The eighth capacitor C8 is coupled between the third capacitor voltage VCAP3 and the ground. The sixth current source CS6 provides the eighth current I8 to charge the eighth capacitor C8 to generate the third capacitor voltage VCAP3. The seventh flip-flop FF7 enables the first signal S1 (i.e., the high logic level) based on the positive signal edge of the pre-burst signal PSR. The ninth inverter INV9 inverts the first signal S1 to generate a first inverted signal S1B. The first NOR gate NOR1 performs a logical NOR operation on the third capacitor voltage VCAP3 and the low-side driving signal LS to reset the first signal S1.

The fourth OR gate OR4 performs a logical OR operation on the first inverted signal S1B and the zero-current signal ZCD to generate the second signal S2. The thirteenth AND gate AND13 performs a logical AND operation on the inverted pre-burst signal PSB and the second signal S2 to generate the burst signal BST. According to an embodiment of the present invention, when the resonant power conversion circuit 100 returns from the burst mode to the normal operation mode (i.e., the burst signal BST transitions from a low logic level to a high logic level), the rising edge of the burst signal BST is aligned with the rising edge of the zero-current signal ZCD. In other words, when the current flowing through the resonant capacitor CR is close to zero, the resonant power conversion circuit 100 returns from the burst mode to the normal operation mode.

Figure 11:
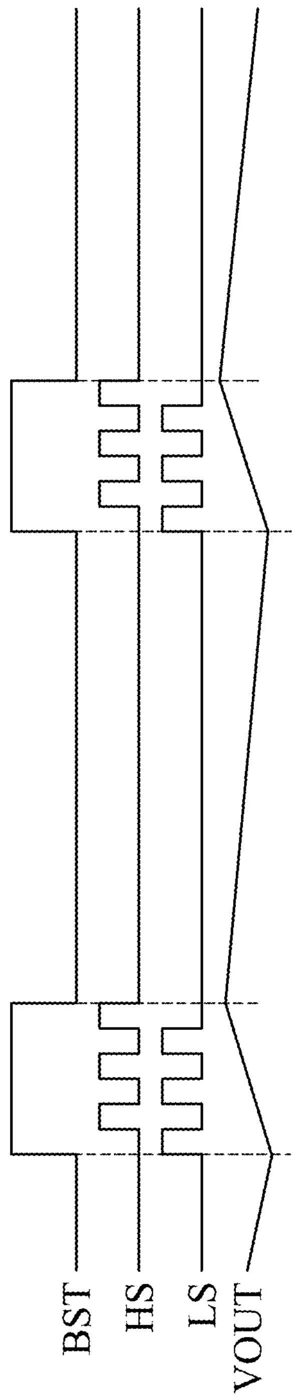
FIG. 11 is a waveform diagram showing a resonant power conversion circuit operating under light load in accordance with an embodiment of the present invention.

FIG. 11 is a waveform diagram showing a resonant power conversion circuit operating under light load in accordance with an embodiment of the present invention. As shown in FIG. 11, when the burst signal BST is at a high logic level (i.e., a disabled state), the resonant power conversion circuit 100 in FIG. 1 operates in the normal operation mode, so the high-side driving signal HS and the low-side driving signal LS are interleaved with each other to turn on the high-side transistor 111 and the low-side transistor 112 alternatively.

When the output voltage VOUT continues to rise and the burst signal BST switches to a low logic level (i.e., the enabled state), the resonant power conversion circuit 100 operates in the burst mode, so that the high-side driving signal HS and the low-side driving signal LS are both kept in the disabled state and the high-side transistor 111 and the low-side transistor 112 are turned off at the same time. In addition, the falling edge of the burst signal BST is aligned with the falling edge of the high-side driving signal HS, and the rising edge of the burst signal BST is aligned with the rising edge of the low-side driving signal LS.

Figure 12:
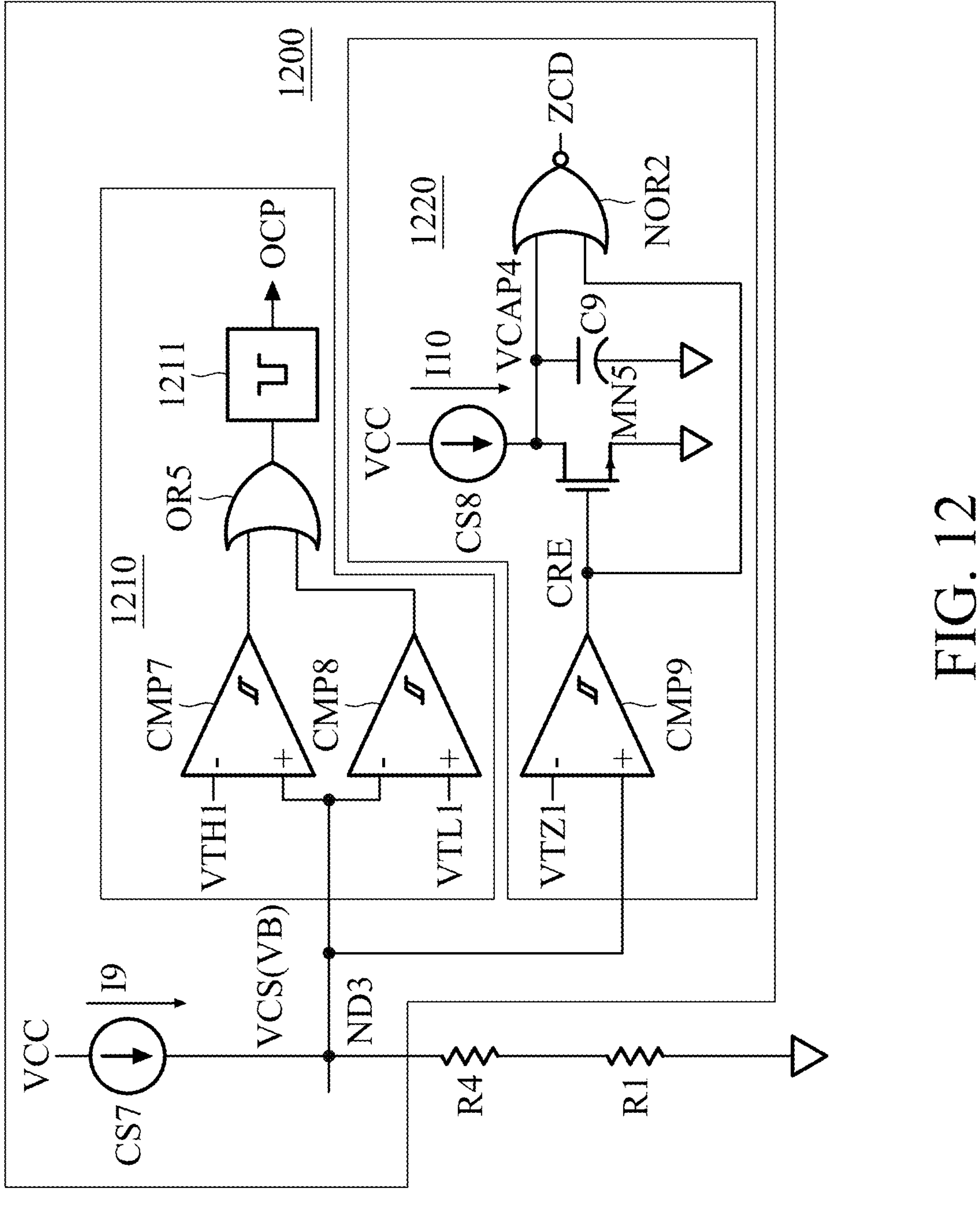
FIG. 12 is a block diagram showing a second current detection circuit in accordance with an embodiment of the present invention.

FIG. 12 is a block diagram showing a second current detection circuit in accordance with an embodiment of the present invention. As shown in FIG. 12, the second current detection circuit 1200, which corresponds to the second current detection circuit 150 in FIG. 1, includes a seventh current source CS7, a first comparison circuit 1210, and a second comparison circuit 1220.

The seventh current source CS7 provides the ninth current I9 flowing to the third detection node ND3, where the ninth current I9 flows through the fourth resistor R4 and the first resistor R1 in FIG. 1 to generate a DC bias voltage VB. As shown in FIG. 1, the AC signal at the resonant node NR is coupled to the first detection node ND1 and the third detection node ND3 through the first capacitor C1. Therefore, the AC signal at the resonant node NR and the DC bias voltages VB at the third detection node ND3 are combined to generate the current detection voltage VCS of the third detection node ND3.

When the current detection voltage VCS exceeds the first upper threshold voltage VTH1 or the current detection voltage VCS is less than the first lower threshold voltage VTL1, the first comparison circuit 1210 is used to generate a negative pulse on the overcurrent signal OCP. When the current detection voltage VCS exceeds the first upper threshold voltage VTH1 or is lower than the first lower threshold voltage VTL1, it means that an overcurrent state occurs (that is, the current flowing through the resonant capacitor CR exceeds the predetermined value). When the current detection voltage VCS is less than the first zero current threshold voltage VTZ1, the second comparison circuit 1220 is used to generate a negative pulse on the zero-current signal ZCD. In other words, when the zero-current signal ZCD is at a low logic level, it means that the current flowing through the resonant capacitor CR is close to zero. According to an embodiment of the present invention, the first zero-current threshold voltage VTZ1 is slightly larger than the bias voltage VB.

More specifically, the first comparison circuit 1210 includes a seventh comparator CMP7, an eighth comparator CMP8, a fifth OR gate OR5, and a delay circuit 1211. The seventh comparator CMP7 is used to compare the current detection voltage VCS with the first upper threshold voltage VTH1, and the eighth comparator CMP8 is used to compare the current detection voltage VCS with the first lower threshold voltage VTL1. When the current detection voltage VCS exceeds the first upper threshold voltage VTH1 or is lower than the first lower threshold voltage VTL1, the output signals of the seventh comparator CMP7 and the eighth comparator CMP8 trigger the delay circuit 1211 through the fifth OR gate OR5 to generate a negative pulse on the over-current signal OCP. According to an embodiment of the present invention, the delay circuit 1211 can be implemented by the delay time generator 700 in FIG. 7, in which the output signal of the fifth OR gate OR5 corresponds to the input signal IN in FIG. 7, and the over-current signal OCP corresponds to the output signal OUT in FIG. 7. The detailed operation will not be repeated herein.

The second comparison circuit 1220 includes a ninth comparator CMP9, an eighth current source CS8, a ninth capacitor C9, a fifth transistor MN5, and a second inverse-OR gate NOR2. The ninth comparator CMP9 compares the current detection voltage VCS with the first zero current threshold voltage VTZ1 to generate a comparison result CRE. The eighth current source CS8 provides the tenth current I10 to the fourth capacitor voltage VCAP4 to charge the ninth capacitor C9. The fifth N-type transistor MN5 couples the fourth capacitor voltage VCAP4 to the ground according to the comparison result CRE. The second NOR gate NOR2 performs a logical NOR operation on the fourth capacitor voltage VCAP4 and the comparison result CRE to generate a zero-current signal ZCD.

According to an embodiment of the present invention, when the comparison result CRE changes from a high logic level to a low logic level, that is, when the current detection voltage VCS drops to less than the first zero current threshold voltage VTZ1, the fifth N-type transistor MN5 is turned off to charge the ninth capacitor C9, thereby generating a positive pulse on the zero-current signal ZCD.

Figure 13:
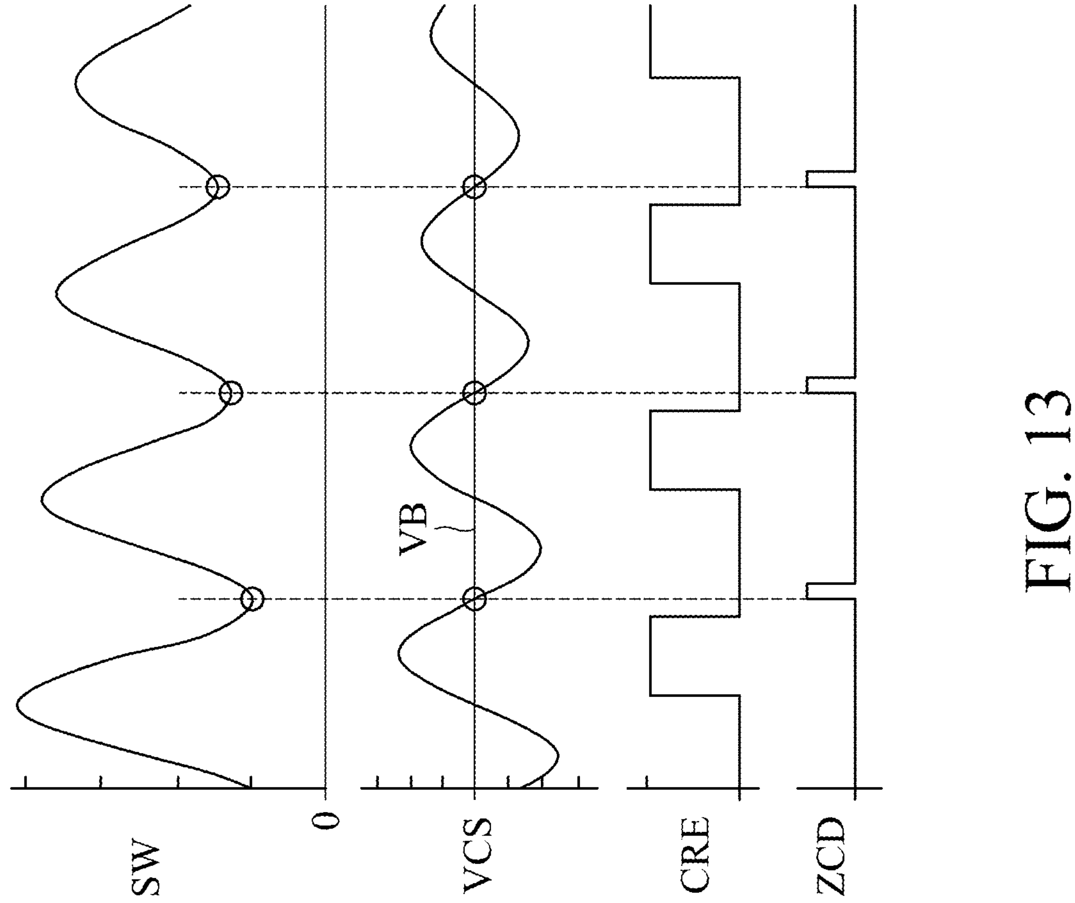
FIG. 13 is a waveform diagram showing a resonant power conversion circuit in accordance with an embodiment of the present invention.

FIG. 13 is a waveform diagram showing a resonant power conversion circuit in accordance with an embodiment of the present invention. The following description of the waveform diagram in FIG. 13 will be combined with FIG. 1 and FIG. 12 to facilitate detailed explanation.

As shown in FIG. 1 and FIG. 13, when the resonant power conversion circuit 100 operates, there is a signal similar to a sinusoidal wave on the switch node SW. As shown in FIG. 1, since the signal of the resonant node NR is coupled to the current detection voltage VCS through the first capacitor C1, and the ninth current I9, the fourth resistor R4, and the first resistor R1 generates a DC bias voltage VB as shown in FIG. 12, so the superposition of the signal at the resonant node NR and the bias voltage VB generates the current detection voltage VCS.

As shown in FIG. 12 and FIG. 13, since the first zero current threshold voltage VTZ1 is slightly higher than the bias voltage VB, when the current detection voltage VCS exceeds the first zero current threshold voltage VTZ1 (can be regarded as the current detection voltage VCS exceeds the bias voltage VB), the comparison result CRE is a high logic level. When the current detection voltage VCS gradually decreases to be lower than the first zero current threshold voltage VTZ1, the comparison result CRE generates a falling edge, causing a positive pulse to be generated on the zero-current signal ZCD. In addition, the positive pulse of the zero-current signal ZCD is generated exactly at the valley position (lowest position) of the signal of the switch node SW.

As shown in FIG. 10, the burst signal BST is a high logic level based on the zero-current signal ZCD being a high logic level. As shown in FIG. 11, when the burst signal BST is a high logic level (i.e., a disabled state), the resonant power conversion circuit 100 enters the normal operation mode. When the resonant power conversion circuit 100 enters the normal operation mode, the low-side driving signal LS first enters the enabled state. That is, when the resonant power conversion circuit 100 switches from the burst mode to the normal operation mode, the low-side transistor 112 is turned on first, and the low-side transistor 112 is turned on at the lowest point of the signal at the switch node SW.

In other words, when the resonant power conversion circuit 100 switches from the burst mode to the normal operation mode, the low-side transistor 112 is turned on the valley of the signal at the switch node SW, which helps to reduce the power loss caused by the switch switching.

Figure 14:
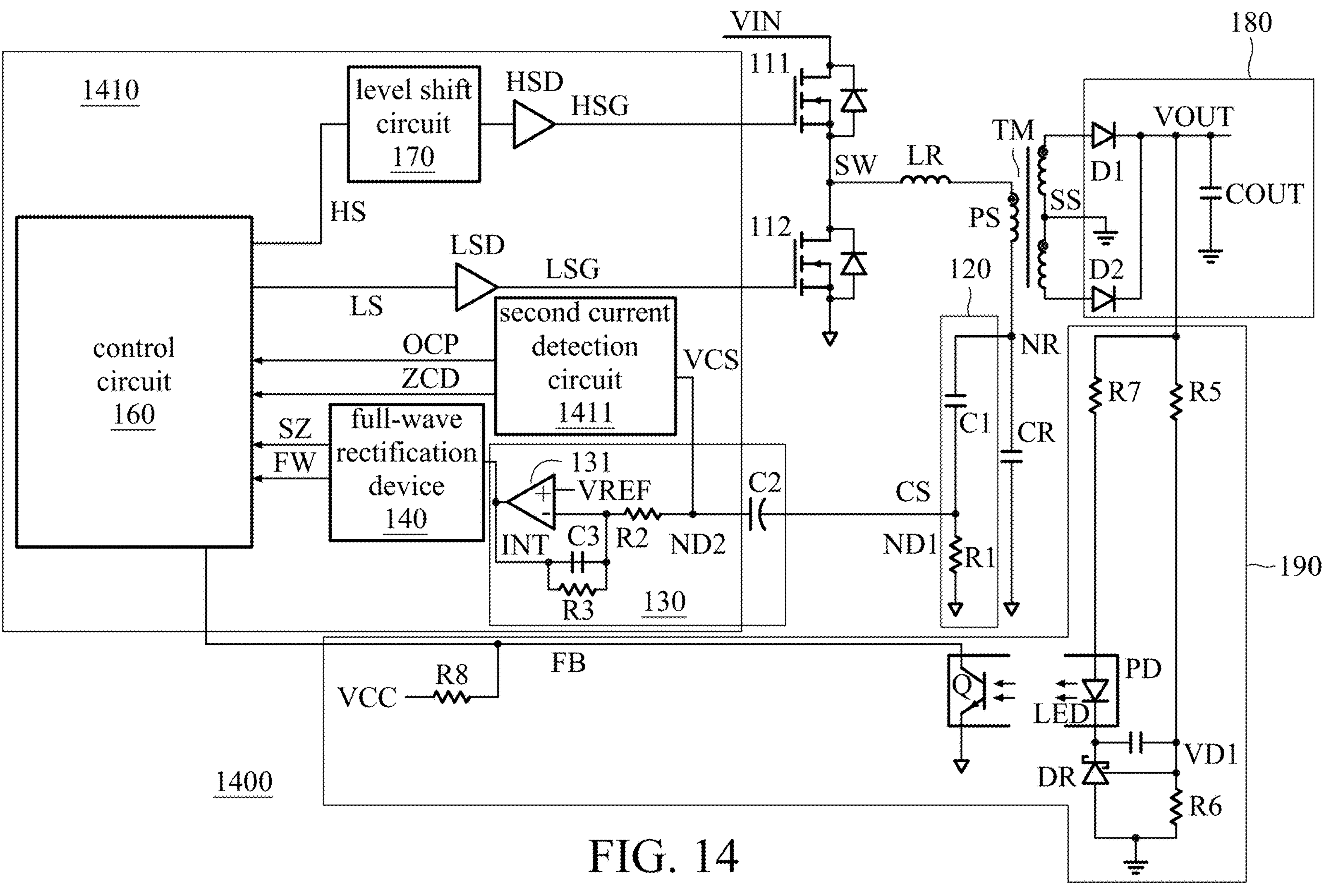
FIG. 14 is a block diagram showing a resonant power conversion circuit in accordance with another embodiment of the present invention.

FIG. 14 is a block diagram showing a resonant power conversion circuit in accordance with another embodiment of the present invention. Comparing the resonant power conversion circuit 1400 with the resonant power conversion circuit 100 in FIG. 1, the fourth resistor R4 in FIG. 1 is omitted, and the second current detection circuit 1411 of the resonant power conversion circuit 1400 captures the current detection voltage VCS from the second detection node ND2.

As shown in FIG. 14, the resonant power conversion circuit 1400 includes a package 1410. The package 1410 is used to combine the second resistor R2, the third resistor R3, the third capacitor C3, the integrating amplifier 131, the full-wave rectification device 140, the second current detection circuit 1411, the control circuit 160, the level shift circuit 170, the high-side driving circuit HSD and the low-side driving circuit LSD are integrated in the same package. According to another embodiment of the present invention, when the resonant power conversion circuit 1400 is used in a non-isolated application, the package 1410 may further include the feedback circuit 190.

Figure 15:
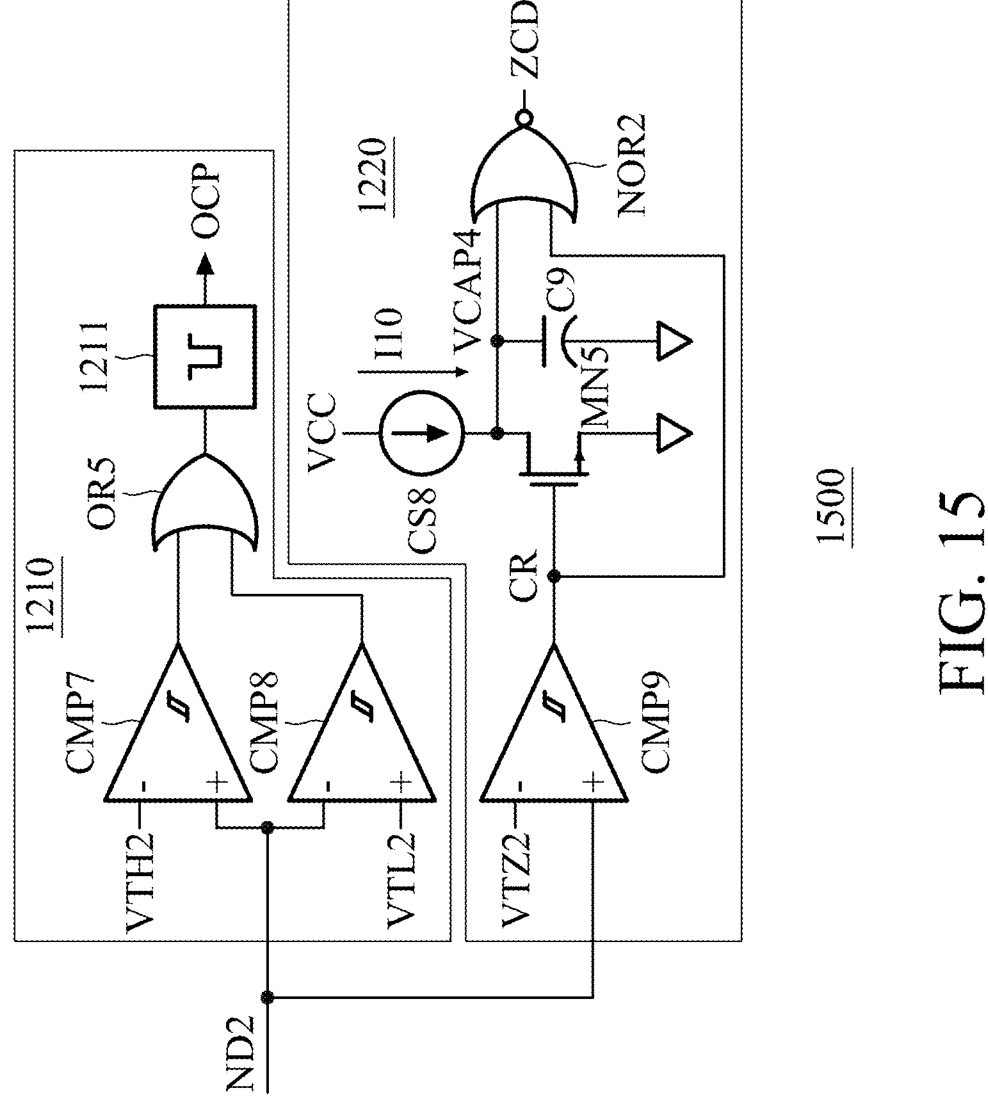
FIG. 15 is a block diagram showing a second current detection circuit in accordance with another embodiment of the present invention.

FIG. 15 is a block diagram showing a second current detection circuit in accordance with another embodiment of the present invention. According to an embodiment of the present invention, the second current detection circuit 1500 corresponds to the second current detection circuit 1411 in FIG. 14. Comparing the second current detection circuit 1500 with the second current detection circuit 1200 in FIG. 12, the second current detection circuit 1500 captures the current detection voltage VCS from the second detection node ND2, so that the seventh current source CS7 in FIG. 12 can be omitted.

As shown in FIG. 15, the second current detection circuit 1500 includes a first comparison circuit 1210 and a second comparison circuit 1220. Compared with the second current detection circuit 1200 in FIG. 12, the first comparison circuit 1210 uses the second upper threshold voltage VTH2 and the second lower threshold voltage VTL2 as comparison standards, and the second comparison circuit 1220 uses the second upper threshold voltage VTH2 and the second lower threshold voltage VTL2 as comparison standards. The second zero current threshold voltage VTZ2 is used as a comparison reference.

In addition, since the current detection voltage VCS of the second current detection circuit 1500 does not have the bias voltage VB in FIG. 12, the second upper threshold voltage VTH2 and the second lower threshold voltage VTL2 in FIG. 15 are different from the first upper threshold voltage VTH1 and the first lower threshold voltage VTL1 respectively, the second zero current threshold voltage VTZ2 is also different from the first zero current threshold voltage VTZ1. According to some embodiments of the present invention, the second zero current threshold voltage VTZ2 is slightly higher than zero.

Figure 16:
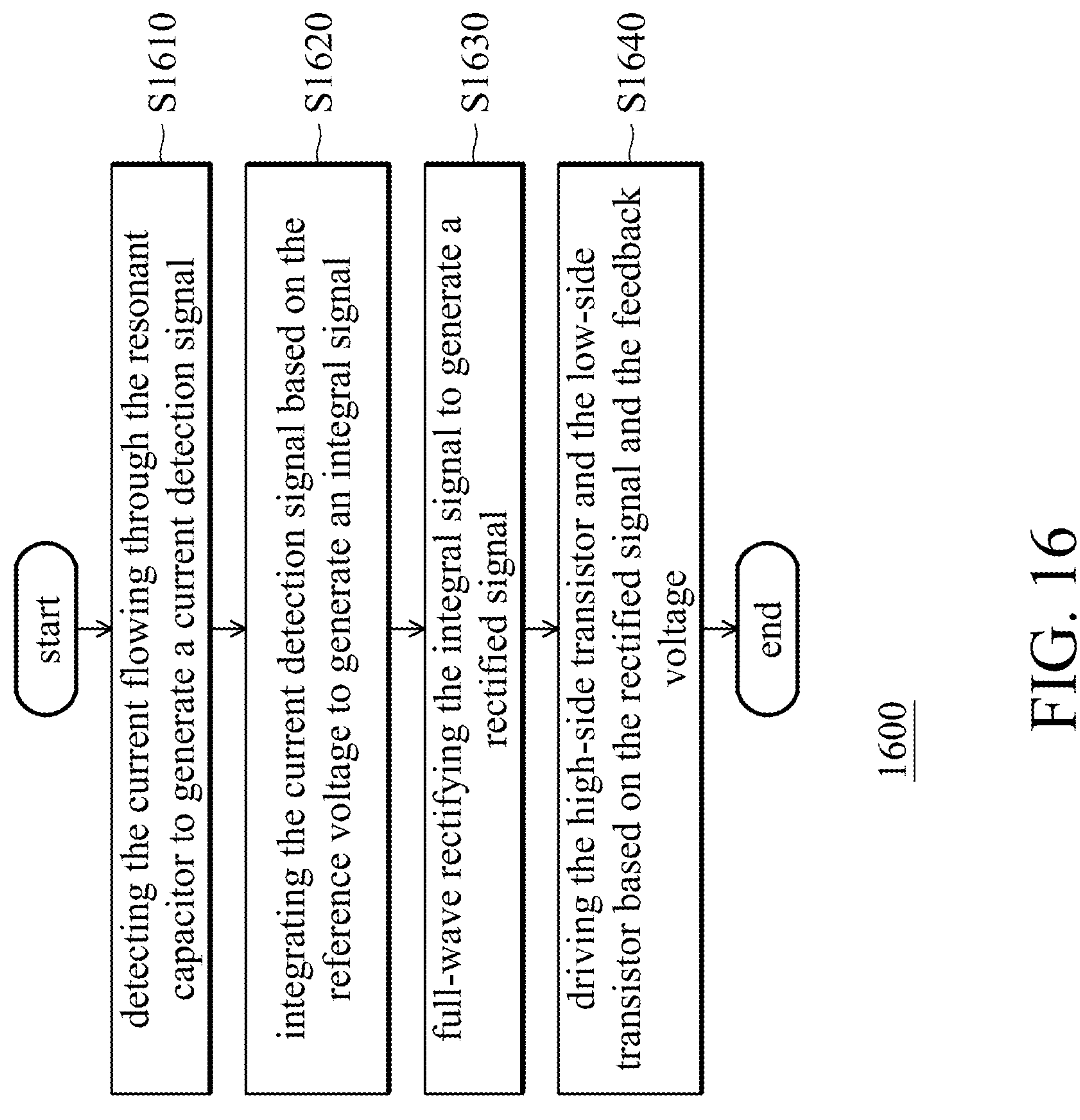
FIG. 16 is a flowchart showing a control method for controlling a resonant power conversion circuit in accordance with an embodiment of the present invention.

FIG. 16 is a flowchart showing a control method for controlling a resonant power conversion circuit in accordance with an embodiment of the present invention. The following description of the control method 1600 in FIG. 16 will be combined with the resonant power conversion circuit 100 in FIG. 1 to facilitate detailed explanation.

First, the first current detection circuit 120 in FIG. 1 is used to detect the current flowing through the resonant capacitor CR to generate a current detection signal CS (Step S1610). As shown in FIG. 1, the first current detection circuit 120 detects the voltage of the resonant node NR to generate the current detection signal CS at the first detection node ND1.

Next, the integrator 130 is used to integrate the current detection signal CS based on the reference voltage VREF to generate an integral signal INT (Step S1620). The full-wave rectification device 140 is used to full-wave rectify the integral signal INT to generate a rectified signal FW (Step S1630). Subsequently, the control circuit 160 is used to drive the high-side transistor 111 and the low-side transistor 112 based on the rectified signal FW and the feedback voltage FB (Step S1640).

According to an embodiment of the present invention, the full-wave rectification device 200 in FIG. 2 rectifies the integral signal INT in full-wave to generate the rectified signal FW and the crossover signal SZ, and the compensation circuit 400 in FIG. 4 generates the feedback voltage FB based on the compensation signal COMP, the control circuit 500 in FIG. 5 generates an high-side driving signal HS and a low-side driving signal LS by comparing the compensation signal COMP and the rectified signal FW and based on the cross signal SZ. In addition, the high-side driving signal HS and the low-side driving signal LS are used to drive the high-side transistor 111 and the low-side transistor 112 respectively.

The present invention proposes a resonant power conversion circuit and control method thereof, which generates a rectification signal through full-wave rectification and a current detection signal related to the current flowing through the resonant capacitor, generates a compensation signal based on the feedback voltage, and compares the rectified signal with the compensation signal so that the enable period of the high-side transistor can be close to the enable period of the low-side transistor, thereby improving the conversion efficiency of the resonant power conversion circuit. In addition, the resonant power conversion circuit and the control method thereof provided in the present invention further detects a time point when the current flowing through the resonant capacitor reaches zero, and turns on the low-side transistor at that time point so as to reduce the power loss generated by the switching of the switch, thereby further improving the conversion efficiency of the resonant power conversion circuit.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A resonant power conversion circuit, comprising:

a resonant capacitor, coupled between a resonant node and a ground;

a transformer, comprising a primary coil and a secondary coil, wherein the primary coil is coupled between a switch node and the resonant node;

a high-side transistor, providing an input voltage to the switch node based on a high-side driving signal;

a low-side transistor, coupling the switch node to the ground based on a low-side driving signal;

a first current detection circuit, generating a current detection signal based on a voltage of the resonant node;

an integrator, generating an integral signal based on the current detection signal;

a full-wave rectification device, full-wave rectifying the integral signal generated by the integrator to generate a rectified signal;

a control circuit, generating the high-side driving signal and the low-side driving signal based on the rectified signal and a feedback voltage;

a regulation circuit, coupled to the secondary coil and converting a current flowing through the secondary coil to an output voltage; and a feedback circuit, generating the feedback voltage based on the output voltage.

2. The resonant power conversion circuit as claimed in claim 1, wherein the first current detection circuit comprises:

a first capacitor, coupled between the resonant node and a first detection node; and a first resistor, coupled between the first detection node and the ground;

wherein the first current detection circuit generates the current detection signal at the first detection node.

3. The resonant power conversion circuit as claimed in claim 2, wherein the integrator comprises:

an integrating amplifier, comprising an integral positive input terminal, an integral negative input terminal, and an integral output terminal, wherein the integral positive input terminal receives a reference voltage, and the integral output terminal generates the integral signal;

a second capacitor, coupled between the first detection node and a second detection node;

a second resistor, coupled between the second detection node and the integral negative input terminal;

a third resistor, coupled between the integral negative input terminal and the integral output terminal; and a third capacitor, coupled between the integral negative input terminal and the integral output terminal.

4. The resonant power conversion circuit as claimed in claim 3, wherein the full-wave rectification device uses a basic voltage as DC level and full-wave rectifies the integral signal to generate the rectified signal;

wherein the basic voltage is equal to a sum of the reference voltage and an offset voltage;

wherein the full-wave rectification device further compares the rectified signal with a first threshold voltage to generate a crossover signal;

wherein the first threshold voltage is slightly higher than the basic voltage.

5. The resonant power conversion circuit as claimed in claim 4, wherein the control circuit comprises:

a digital circuit, gradually increasing a soft-start voltage to the feedback voltage in a predetermined period;

a first amplifier, comprising a first positive input terminal, a first negative input terminal, and a first output terminal, wherein the first positive input terminal receives the soft-start voltage, and the first negative input terminal is coupled to the first output terminal;

a second amplifier, comprising a second positive input terminal, a second negative input terminal, and a second output terminal, wherein the second positive input terminal receives a feedback threshold voltage, and the second output terminal generates a compensation voltage;

a second resistor, coupled between the second negative input terminal and the first output terminal and generating a difference current;

an N-type transistor, comprising a gate terminal, a drain terminal, and a source terminal, wherein the gate terminal is coupled to the second output terminal, and the source terminal is coupled to the second negative terminal;

a current mirror, mapping the difference current to at least one mapping current; and a summing circuit, subtracting a sawtooth wave from the compensation voltage to generate a compensation signal;

wherein when the soft-start voltage is less than the feedback threshold voltage, the compensation voltage is equal to the feedback threshold voltage;

wherein when the soft-start voltage is not less than the feedback threshold voltage, the compensation voltage is equal to the soft-start voltage.

6. The resonant power conversion circuit as claimed in claim 5, wherein when the rectified signal is less than the first threshold voltage, the full-wave rectification device sets the crossover signal to a disabled state;

wherein when the rectified signal is not less than the first threshold voltage, the full-wave rectification device sets the crossover signal to an enabled state;

wherein in response to the crossover signal changing from the disabled state to the enabled state, the control circuit sets a phase signal to the enabled state;

wherein in response to the rectified signal exceeding the feedback voltage, the control circuit sets the phase signal to the disabled state based on a high-side dead time signal or a low-side dead time signal;

wherein the high-side dead time signal controls a high-side dead time of the high-side driving signal;

wherein the low-side dead time signal controls a low-side dead time of the low-side driving signal.

7. The resonant power conversion circuit as claimed in claim 6, wherein when the high-side driving signal turns on the high-side transistor and the phase signal is in the enabled state, the control circuit disables the high-side driving signal in response to the rectified signal exceeding the feedback voltage;

wherein when the high-side signal turns off the high-side transistor, the control circuit enables the low-side driving signal to turn on the low-side transistor after the low-side dead time;

wherein when the low-side driving signal turns on the low-side transistor and the phase signal is in the enabled state, the control circuit disables the low-side driving signal in response to the compensation signal exceeding the feedback voltage;

wherein when the low-side driving signal turns off the low-side transistor, the control circuit enables the high-side driving signal to turn on the high-side transistor after the high-side dead time.

8. The resonant power conversion circuit as claimed in claim 6, wherein the control circuit further limits an enable period of the high-side driving signal and an enable period of the low-side driving signal to no longer than a maximum enable period.

9. The resonant power conversion circuit as claimed in claim 6, wherein the offset voltage is determined based on a difference between an enable period of the high-side driving signal and an enable period of the low-side driving signal;

wherein the offset voltage is configured to adjust the enable period of the high-side driving signal and the enable period of the low-side driving signal so that the enable period of the high-side driving signal is close to the enable period of the low-side driving signal.

10. The resonant power conversion circuit as claimed in claim 6, wherein the full-wave rectification device comprises:

a fourth resistor, coupled between the reference voltage and the basic voltage, wherein a voltage across the fourth resistor generates the offset voltage;

a first current source, providing a first current flowing to the basic voltage; and an automatic adjustment circuit, sinking an adjustment current from the basic voltage based on the high-side driving signal, the low-side driving signal, the high-side dead time signal, and the low-side dead time signal.

11. The resonant power conversion circuit as claimed in claim 10, wherein in response to the first current exceeding the adjustment current, the offset voltage is positive and the basic voltage exceeds the reference voltage;

wherein in response to the first current being less than the adjustment current, the offset voltage is negative and the basic voltage is less than the reference voltage;

wherein in response to the first current being equal to the adjustment current, the basic voltage is equal to the reference voltage.

12. The resonant power conversion circuit as claimed in claim 10, wherein the automatic adjustment circuit comprises:

a time-to-voltage conversion circuit, configured to respectively convert an enable period of the high-side driving signal and an enable period of the low-side driving signal into a high-side enable-period voltage and a low-side enable-period voltage;

wherein the time-to-voltage conversion circuit comprises:

a second current source, providing a second current;

a first switch, providing the second current to a charge node based on the high-side driving signal or the low-side driving signal being enabled;

a second switch, coupling the charge node to the ground in the high-side dead time and the low-side dead time;

a fourth capacitor, coupled between the charge node and the ground;

a fifth capacitor, coupled between a high-side enable-period voltage and the ground;

a sixth capacitor, coupled between a low-side enable-period voltage and the ground;

a third switch, coupling the charge node to the high-side enable-period voltage based on the high-side driving signal being enabled; and a fourth switch, coupling the charge node to the low-side enable-period voltage based on the low-side driving signal being enabled;

wherein the high-side enable-period voltage represents the enable period of the high-side driving signal, and the low-side enable-period voltage represents the enable period of the low-side driving signal.

13. The resonant power conversion circuit as claimed in claim 12, wherein the automatic adjustment circuit further comprises:

a first comparison circuit, comparing the high-side enable-period voltage to the low-side enable period to generate an up-count signal and a down-count signal;

a plurality of registers, configured to latch the up-count signal and the down-count signal in the high-side dead time and the low-side dead time;

a counter, up-counting a digital code based on the up-count signal being enabled and down-counting the digital code based on the down-count signal being enabled; and a digital-to-analog converter, generating the adjustment current based on the digital code;

wherein when the high-side enable-period voltage exceeds the low-side enable-period voltage, the first comparison circuit enables the up-count signal and disables the down-count signal;

wherein when the high-side enable-period voltage does not exceed the low-side enable-period voltage, the first comparison circuit disables the up-count signal and enables the down-count signal.

14. The resonant power conversion circuit as claimed in claim 10, wherein in response to the output voltage increasing, the feedback voltage decreases;

wherein in response to the feedback voltage being less than a low-power threshold voltage, a low-side dead time signal enables a burst signal, so that the control circuit operates in a burst mode based on the burst signal being enabled;

wherein when the control circuit operates in the burst mode, the high-side transistor and the low-side transistor are turned off;

wherein a duration of the burst mode increases as output power of the output voltage decreases;

wherein the duration is determined by the mapping current.

15. The resonant power conversion circuit as claimed in claim 14, further comprising:

a second current detection circuit, generating an over-current signal and a zero-current signal based on the current detection signal;

wherein when a current flowing through the resonant capacitor exceeds a predetermined value, the over-current signal is in a reset state and the control circuit disables the high-side driving signal and the low-side driving signal based on the over-current signal being in the reset state;

wherein when the current flowing through the resonant capacitor is close to zero, the zero-current signal is in the enabled state, so that the control circuit enables the low-side driving signal based on the zero-current signal being in the enabled state.

16. The resonant power conversion circuit as claimed in claim 15, wherein the control circuit further operates in the burst mode based on the burst signal being in the enabled state and the zero-current signal being in the enabled state;

wherein the burst mode starts when the high-side driving signal is in the disabled state and ends when the low-side driving signal is in the enabled state.

17. The resonant power conversion circuit as claimed in claim 15, wherein the second current detection circuit comprises:

a fifth resistor, coupled between the first detection node and a third detection node;

a third current source, providing a third current flowing to the third detection node so that the third current flows through the fifth resistor and the first resistor, wherein a current detection voltage is generated at the third detection node;

a second comparison circuit, comparing the current detection voltage with a first upper threshold voltage and a first lower threshold voltage to generate the over-current signal; and a third comparison circuit, comparing the current detection voltage with a zero-current threshold voltage to generate the zero-current signal;

wherein when the current detection voltage exceeds the first upper threshold voltage or the current detection voltage is less than the first lower threshold voltage, the second comparison circuit sets the over-current signal to be in the reset state;

wherein when the current detection voltage exceeds the zero-current threshold voltage, the third comparison circuit sets the zero-current signal to be in the enabled state;

wherein the third current flows through the fifth resistor and the first resistor to generate a DC voltage;

wherein the zero-current threshold voltage is slightly higher than the DC voltage.

18. The resonant power conversion circuit as claimed in claim 15, wherein the second current detection circuit comprises:

a second comparison circuit, comparing a voltage of the second detection node with a second upper threshold voltage and a second lower threshold voltage to generate the over-current signal; and a third comparison circuit, comparing the voltage of the second detection node with a zero-current threshold voltage to generate the zero-current signal;

wherein when the voltage of the second detection node exceeds the second upper threshold voltage or the voltage of the second detection node is less than the second lower threshold voltage, the second comparison circuit sets the over-current signal to be in the reset state;

wherein the voltage of the second detection node exceeds the zero-current threshold voltage, the third comparison circuit sets the zero-current signal to be in the enabled state;

wherein the zero-current threshold voltage is slightly higher than zero.

19. A control method for controlling a resonant power conversion circuit, wherein the resonant power conversion circuit comprises a resonant capacitor coupled between a resonant node and a ground, a transformer comprising a primary coil and a secondary coil, a high-side transistor providing an input voltage to a switch node, a low-side transistor coupling the switch node to the ground, a regulation circuit regulating a current flowing through the secondary coil to an output voltage, and a feedback circuit generating a feedback voltage based on the output voltage, wherein the primary coil is coupled between the switch node and the resonant node, wherein the control method comprises:

generating a current detection signal by using a first current detection circuit to detect a current flowing through the resonant capacitor;

integrating the current detection signal based on a reference voltage to generate an integral signal;

full-wave rectifying the integral signal to generate a rectified signal; and driving the high-side transistor and the low-side transistor based on the rectified signal and a feedback voltage;

wherein the first current detection circuit comprises a first capacitor and a first resistor;

wherein the first capacitor is coupled between the resonant node and a first detection node, and the first resistor is coupled between the first detection node and the ground;

wherein the current detection signal is generated at the first detection node.

20. The control method as claimed in claim 19, further comprising:

using a basic voltage as DC level to full-wave rectify the integral signal so as to generate the rectified signal; and comparing the rectified signal with a first threshold voltage to generate a crossover signal;

wherein the basic voltage is equal to a sum of the reference voltage and an offset voltage;

wherein the first threshold is slightly higher than the basic voltage.

21. The control method as claimed in claim 20, further comprising:

gradually increasing a soft-start voltage to the feedback voltage in a predetermined period;

converting the soft-start voltage to a compensation voltage; and subtracting a sawtooth wave from the compensation voltage to generate a compensation signal;

wherein when the soft-start voltage is less than the feedback threshold voltage, the compensation voltage is equal to the feedback threshold voltage;

wherein when the soft-start voltage is not less than the feedback threshold voltage, the compensation voltage is equal to the soft-start voltage.

22. The control method as claimed in claim 21, further comprising:

when the rectified signal is less than the first threshold voltage, setting the crossover signal to be a disabled state;

when the rectified signal is not less than the first threshold voltage, setting the crossover signal to be an enabled state;

in response to the crossover signal changing from the disabled state to the enabled state, setting a phase signal to be in the enabled state; and in response to the rectified signal not being less than the compensation signal, setting the phase signal to be in the disabled state during a high-side dead time or a low-side dead time;

wherein the low-side dead time is a period after the high-side transistor is turned off and before the low-side transistor is turned on;

wherein the high-side dead time is a period after the low-side transistor is turned off and before the high-side transistor is turned on.

23. The control method as claimed in claim 22, further comprising:

when the high-side transistor is turned on and the phase signal is in the enabled state, turning off the high-side transistor in response to the rectified signal exceeding the compensation signal, wherein when the high-side transistor is turned off, the low-side transistor is turned on after the low-side dead time;

when the low-side transistor is turned on and the phase signal is in the enabled state, turning off the low-side transistor in response to the rectified signal exceeding the compensation signal; and when the low-side transistor is turned off, turning on the high-side transistor after the high-side dead time.

24. The control method as claimed in claim 22, further comprising:

limiting an on-time of the high-side transistor and an on-time of the low-side transistor to not exceeding a maximum enable period.

25. The control method as claimed in claim 22, further comprising:

determining the offset voltage based on a difference of the on-time of the high-side transistor and the on-time of the low-side transistor;

wherein the offset voltage is configured to adjust the on-time of the high-side transistor and the on-time of the low-side transistor so that the on-time of the high-side transistor is close to the on-time of the low-side transistor.

26. The control method as claimed in claim 22, further comprising:

generating the offset voltage by using a voltage across a first resistor, wherein the first resistor is coupled between the reference voltage and the basic voltage;

providing a first current flowing to the basic voltage;

sinking an adjust current from the basic voltage based on the high-side transistor and the low-side transistor being turned on and off, the high-side dead time, and the low-side dead time by using an automatic adjustment circuit;

wherein the offset voltage is positive and the basic voltage exceeds the reference voltage in response to the first current not being less than the adjust current;

wherein the offset voltage is negative and the basic voltage is less than the reference voltage in response to the first current being less than the adjust current; and the basic voltage is equal to the reference voltage in response to the first current being equal to the adjust current.

27. The control method as claimed in claim 26, further comprising:

operating in a burst mode in response to the feedback voltage being less than a low-power threshold voltage, wherein the feedback voltage decreases in response to the output voltage increasing;

simultaneously turning off the high-side transistor and the low-side transistor during the burst mode; and increasing a period of the burst mode in response to output power of the output voltage decreasing.

28. The control method as claimed in claim 27, further comprising:

when a current flowing through the resonant capacitor exceeds a predetermined value, simultaneously turning off the high-side transistor and the low-side transistor; and when the current flowing through the resonant capacitor is close to zero, turning on the low-side transistor;

wherein the burst mode starts when the high-side transistor is turned off and ends when the low-side transistor is turned on.

* * * * *